(12) United States Patent
Kanakasabai et al.

(10) Patent No.: US 12,438,402 B2
(45) Date of Patent: Oct. 7, 2025

(54) FOREIGN OBJECT DETECTION IN A WIRELESS POWER TRANSFER SYSTEM

(71) Applicant: GE Intellectual Property Licensing, LLC, Niskayuna, NY (US)

(72) Inventors: Viswanathan Kanakasabai, Bangalore (IN); Jayanti Ganesh, Bangalore (IN); Subbarao Tatikonda, Bangalore (IN)

(73) Assignee: GE Intellectual Property Licensing, LLC, Niskayuna, NY (US)

( * ) Notice: Subject to any disclaimer, the term of this patent is extended or adjusted under 35 U.S.C. 154(b) by 0 days.

(21) Appl. No.: 18/713,789

(22) PCT Filed: Jan. 25, 2023

(86) PCT No.: PCT/US2023/061227
§ 371 (c)(1),
(2) Date: May 28, 2024

(87) PCT Pub. No.: WO2023/147335
PCT Pub. Date: Aug. 3, 2023

(65) Prior Publication Data
US 2025/0030275 A1    Jan. 23, 2025

(30) Foreign Application Priority Data
Jan. 28, 2022   (IN) .............................. 202211004861

(51) Int. Cl.
*H02J 50/60*   (2016.01)
*H02J 50/40*   (2016.01)
(Continued)

(52) U.S. Cl.
CPC .......... *H02J 50/60* (2016.02); *H02J 50/402* (2020.01); *H02J 50/80* (2016.02); *H02J 50/12* (2016.02)

(58) Field of Classification Search
CPC .......... H02J 50/60; H02J 50/80; H02J 50/402; H02J 50/12
(Continued)

(56) References Cited

U.S. PATENT DOCUMENTS 9,997,929 B2 * 6/2018 Yamamoto ............. G01V 3/101
10,033,223 B2 * 7/2018 Van Wageningen .... H02J 50/10
(Continued)

FOREIGN PATENT DOCUMENTS

WO   2023147335   8/2023

OTHER PUBLICATIONS

"PCT application No. PCT/US23/61227 International Search Report and Written Opinion", Apr. 26, 2024, 11 pages.
(Continued)

*Primary Examiner* — Alfonso Perez Borroto
(74) *Attorney, Agent, or Firm* — DeLizio, Peacock, Lewin & Guerra LLP

(57) ABSTRACT

This disclosure provides systems, methods and apparatuses for foreign object detection (FOD) in a wireless power transfer (WPT) system. An FOD protocol can be coordinated with different operating phases of the WPT system, such as an idle phase, a configuration phase, a connected phase, and a power transfer phase. An FOD assessment unit may perform foreign object detection assessments as part of each operating phase. The FOD protocol may include an initial idle phase foreign object detection assessment in the idle phase to handle a scenario in which a Power Receiver is placed on the Power Transmitter before the Power Transmitter has been turned on. The FOD assessment unit may adjust offset values used during each FOD assessment to improve accuracy of foreign object detection. The offset values may be adapted to accommodate movement of the Power Receiver after the initial idle phase foreign object detection assessment.

22 Claims, 14 Drawing Sheets

(51) Int. Cl.
*H02J 50/80* (2016.01)
*H02J 50/12* (2016.01)

(58) Field of Classification Search
USPC .......................................... 307/104
See application file for complete search history.

(56) References Cited

U.S. PATENT DOCUMENTS

| | | | |
|---|---|---|---|
| 10,305,332 B2 | 5/2019 | Liu et al. | |
| 10,411,524 B2* | 9/2019 | Widmer | B60L 53/39 |
| 11,394,253 B2* | 7/2022 | Widmer | H04B 5/263 |
| 2010/0148907 A1* | 6/2010 | Younsi | H01F 38/30 |
| | | | 336/180 |
| 2014/0339905 A1 | 11/2014 | Moritsuka et al. | |
| 2014/0354223 A1 | 12/2014 | Lee et al. | |
| 2016/0020642 A1 | 1/2016 | Liu et al. | |
| 2017/0093214 A1* | 3/2017 | Watanabe | H02J 50/60 |
| 2019/0027973 A1* | 1/2019 | Baek | H02J 50/80 |
| 2020/0328616 A1 | 10/2020 | Van Wageningen et al. | |
| 2020/0395793 A1 | 12/2020 | Ettes et al. | |

OTHER PUBLICATIONS

Xia, et al., "Foreign Object Detection for Electric Vehicle Wireless Charging", Electronics 2020, 9(5), 805; https://doi.org/10.3390/electronics9050805, May 14, 2020, 26 pages.

\* cited by examiner

FOREIGN OBJECT DETECTION IN A WIRELESS POWER TRANSFER SYSTEM

CROSS-REFERENCE TO RELATED APPLICATIONS

This Patent Application is a National Stage of International Application No. PCT/US23/61227, filed Jan. 25, 2023, and claims the benefit of priority to India Non-Provisional patent application No. 202211004861, filed Jan. 28, 2022, assigned to the assignee hereof, the disclosures of which are incorporated by reference in this Patent Application.

TECHNICAL FIELD

This disclosure relates generally to wireless power. More specifically, this application relates to foreign object detection in a wireless power transfer system.

DESCRIPTION OF RELATED TECHNOLOGY

Technology has been developed to enable the wireless transmission of power from a Power Transmitter (sometimes also referred to as a "wireless power transmission apparatus") to a Power Receiver (sometimes also referred to as a "wireless power reception apparatus"). A Power Receiver may be included in various types of devices, such as mobile devices, small electronic devices, computers, tablets, gadgets, appliances (such as cordless blenders, kettles, or mixers), and some types of larger electronic devices, among other examples. Wireless power transmission may be referred to as a contactless power transmission or a non-contact power transmission. The wireless power may be transferred using inductive coupling or resonant coupling between the Power Transmitter and the Power Receiver. For example, the Power Transmitter may include a primary coil that produces an electromagnetic field. The electromagnetic field may induce an electromotive force in a secondary coil of the Power Receiver when the secondary coil is placed in proximity to the primary coil. In this configuration, the electromagnetic field may wirelessly transfer power to the secondary coil.

In a wireless power transfer system, when a foreign metal object (such as a key, a coin, a metallic can, or aluminum foil, among other examples) is in proximity of the electromagnetic field, the foreign metal object may be undesirably heated up due to eddy currents. This may result in safety hazards, such as fire safety hazards. Furthermore, the efficiency of wireless power transfer process may be inadvertently affected or disrupted. Traditional techniques for detecting foreign objects in a wireless power transfer system may be inadequate or ineffective to prevent such safety hazards.

SUMMARY

The systems, methods, and apparatuses of this disclosure each have several innovative aspects, no single one of which is solely responsible for the desirable attributes disclosed herein.

One innovative aspect of the subject matter described in this disclosure can be implemented as method for foreign object detection (FOD) in a wireless power transfer (WPT) system. The method may include initializing an FOD assessment unit prior to or as part of an idle phase in response to a user input to turn on a Power Transmitter. Initializing the FOD assessment unit may include setting an FOD flag to a first value to represent that an initial idle phase foreign object detection assessment has not yet been performed. The method may include indicating an FOD fault status if the Power Transmitter transitions from the idle phase to a different operating phase when the FOD flag is set to the first value.

Another innovative aspect of the subject matter described in this disclosure can be implemented as system for FOD. The system may include a Power Transmitter configured to initialize an FOD assessment unit prior to or as part of an idle phase in response to a user input to turn on the Power Transmitter. Initializing the FOD assessment unit may include setting an FOD flag to a first value to represent that an initial idle phase foreign object detection assessment has not yet been performed. The system may include the FOD assessment unit being configured to indicate an FOD fault status if the Power Transmitter transitions from the idle phase to a different operating phase when the FOD flag is set to the first value.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

Like reference numbers and designations in the various drawings indicate like elements.

DETAILED DESCRIPTION

Figure 1:
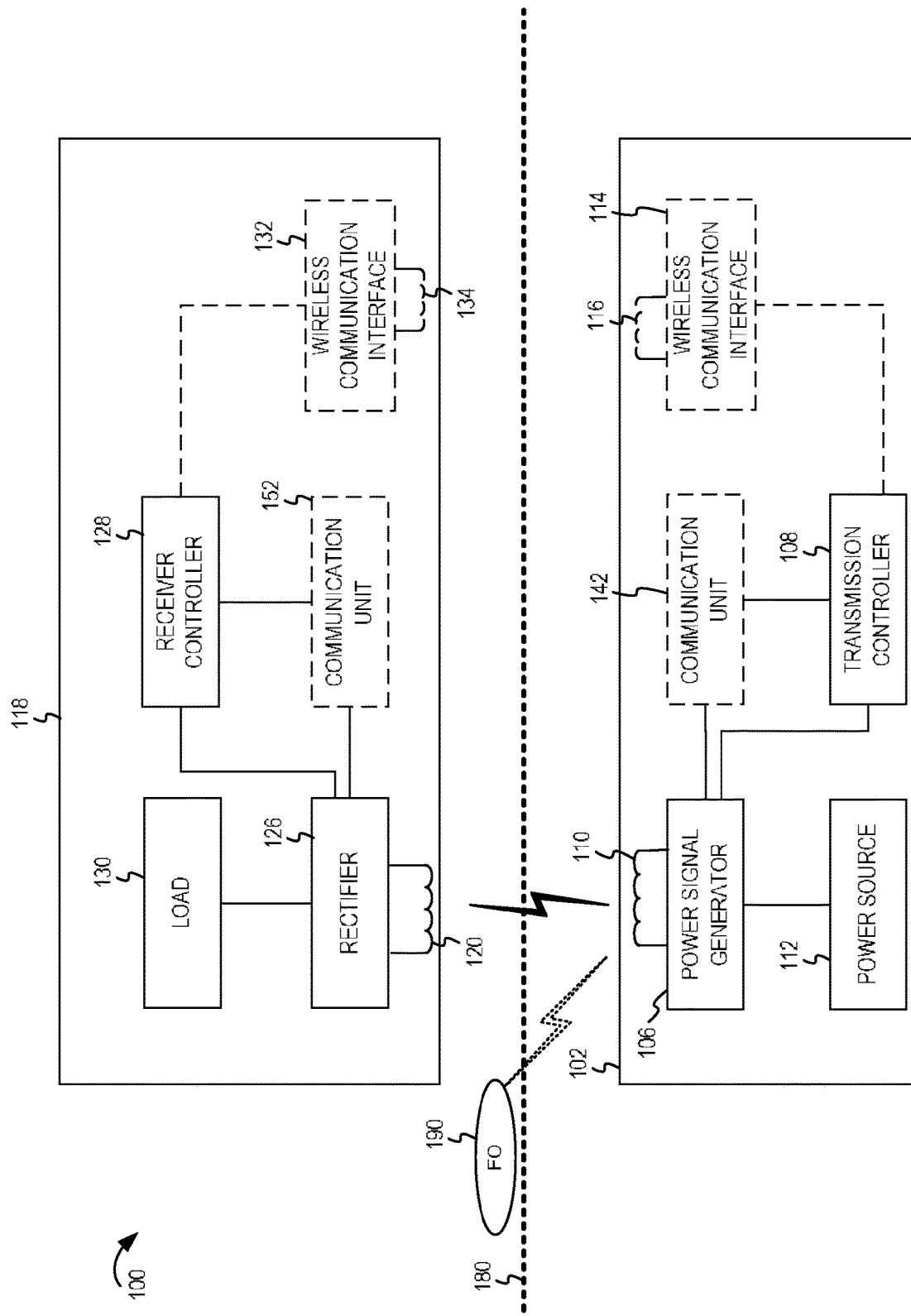
FIG. 1 shows a block diagram of an example wireless power transfer (WPT) system.

A wireless power transfer (WPT) system may include a wireless power transmission apparatus and a wireless power reception apparatus. The wireless power transmission apparatus may include a Power Transmitter (sometimes referred to as a "PTx"). The wireless power transmission apparatus may include other elements; however, the terms "wireless power transmission apparatus" and "Power Transmitter" may be used, interchangeably, to represent all or part of an apparatus of the WPT system that transfers power to a wireless power reception apparatus via inductive or resonant coupling of an oscillating electromagnetic field. The wireless power reception apparatus may include a Power Receiver (sometimes referred to as a "PRx"). The wireless power reception apparatus may include other elements; however, the terms "wireless power reception apparatus" and "Power Receiver" may be used, interchangeably, to represent all or part of an apparatus of the WPT system that receives power via the inductive or resonant coupling of the oscillating electromagnetic field. An interface surface may demark a space between the Power Transmitter and the Power Receiver.

Occasionally, a foreign object (sometimes referred to as a foreign metal object) may be in proximity of the electromagnetic field, such as in or near the interface surface. A foreign object may be any object that is electrically conductive or have detectable magnetic permeability and that is not part of a WPT system but is inadvertently present in an operative environment of the WPT system. Non-limiting examples of foreign objects may include a ferrous object, a metallic can, a coin, a metal spoon, a key, aluminum foil, or other electrically conductive or ferrous objects. When a foreign object is in proximity of the electromagnetic field, the foreign object may interact with the electromagnetic field—which can negatively impact the wireless power transfer or cause the foreign object to become undesirably heated up.

The WPT system may include a foreign object detection system (sometimes also referred to as a "detection apparatus"). The detection apparatus may include a plurality of detection coils used to obtain or generate values (also referred to as "detection values" or "FOD values") for a foreign object detection (FOD) assessment. Each detection value may represent a comparison of current, voltage, impedance, or other electrical characteristic between two coils of a coil pair. For example, the detection value may be a differential current, differential voltage, or any value that indicates a difference in impedance associated with a pair of detection coils. As part of an FOD assessment, an FOD assessment unit may measure a detection value for each pair of detection coils while those detection coils are actively or passively excited with electrical energy. For example, the detection apparatus may include sensors or other circuitry to measure or obtain the detection values and send the detection values to the FOD assessment unit. The FOD assessment unit may be part of the Power Transmitter (such as implemented in a controller of the Power Transmitter), part of the detection apparatus (such as a control unit of the detection apparatus), part of an appliance (such as a processor of the appliance) that contains the Power Transmitter and the detection apparatus, or as an external processor, among other examples. The FOD assessment unit may compare a detection value to a detection threshold to determine whether a metal object is near one of the detection coils in a coil pair. In some types of foreign object detection assessments, the FOD assessment unit may determine whether the detection value crossing detection threshold is due to a foreign object or a Power Receiver movement based on how many coil pairs indicate the presence of the metal object. The metal object may be determined to be a foreign object when fewer coil pairs (such as less than a threshold quantity) have detected the presence of the metal object. Conversely, the FOD assessment unit may determine that the metal object is a Power Receiver when more coil pairs (such as more than the threshold quantity) have detected the presence of the metal object.

A WPT system operates in different phases, such as an idle phase, a configuration phase, a connected phase, and a power transfer phase. A technical specification may define how the Power Transmitter and Power Receiver can transition between the operating phases. For example, the Power Transmitter typically begins in the idle phase after being turned on. Turning on the Power Transmitter refers to powering a controller, communication unit, driver, or other components of the Power Transmitter except for the primary coil. The primary coil is only energized in the power transfer phase after a communication to do so between a Power Receiver and the Power Transmitter. When a Power Receiver is placed on the interface surface, a pinging of the Power Transmitter's communication coil detects the presence of Power Receiver. A handshaking process happens between the Power Transmitter and the Power Receiver. Based on the successful handshaking, the Power Transmitter transitions from the idle phase to the configuration phase. The Power Transmitter and Power Receiver communicate regarding transitions from the configuration phase to the connected phase and power transfer phase. Traditional foreign object detection techniques are related to the power transfer phase without regard to unique scenarios that can happen in specific operating phases such as the idle phase.

This disclosure provides systems, methods and apparatuses for foreign object detection in a wireless power transfer system that operates in different operating phases. The type of foreign object detection assessment performed at any particular time may depend on the operating phase of the Power Transmitter. Thus, the FOD assessment unit may follow a protocol (sometimes referred to as an "FOD protocol") that defines how FOD assessments are performed in relation to various operating phases. For example, the FOD protocol may include an initial idle phase foreign object detection assessment to detect for foreign objects and mitigate a scenario in which a Power Receiver is placed on the Power Transmitter before the Power Transmitter has been turned on. The FOD protocol may include subsequent foreign object detection assessments (such as pre-power foreign object detection assessments and during-power foreign object detection assessments) as the Power Transmitter transitions to other operating phases towards the power transfer phase. The Power Transmitter (in coordination with the FOD assessment unit) may prevent the WPT system from producing wireless power in the event that a foreign object is introduced before or during each operating phase.

Each foreign object detection assessment may be based on a comparison of detection values with a detection threshold, and in some operating phases, the foreign object detection assessment is further based on a comparison of how many coil pairs indicate the presence of a metal object. In accordance with aspects of this disclosure, the FOD assessment unit may adjust the detection values using offset values to improve accuracy of foreign object detection in the WPT system. The offset values are added to (or subtracted from) corresponding ones of the detection values to compensate for system changes, such as a discrepancy in the detection coils, movement of a Power Receiver, or presences of non-foreign objects (sometimes referred to as "friendly objects" or "friendly metals") in the WPT system, among other examples.

In some implementations, the FOD assessment unit may be configured to perform an initial idle phase foreign object detection assessment to detect for a foreign object when a Power Transmitter is first turned on or initialized. The Power Transmitter may cause the FOD assessment unit to perform an initial idle phase foreign object detection assessment soon after the Power Transmitter is first turned on and in relation to the idle phase. For an initial idle phase foreign object detection assessment, the offset values (referred to as "initial offset values") are based on "calibration values" that may be predetermined. For example, the calibration values may be previously measured (referred to as "calibration" or being "calibrated") at a moment when the interface surface is known to be free of Power Receivers and foreign objects, such as when the Power Transmitter is installed or serviced. The calibration values may be stored in the non-volatile memory of the Power Transmitter such that they remain available for the FOD assessment unit when the Power Transmitter is first turned on. As part of an FOD initialization, the FOD assessment unit determines the plurality of offset values (as "initial offset values") based on the calibration values obtained from the non-volatile memory. As described further herein, the initial idle phase foreign object detection assessment may use a different criteria for detecting foreign objects compared to the other operating phases in which a Power Receiver is already present in the interface surface. In the event that a Power Receiver is already present when the Power Transmitter is turned on, the initial idle phase foreign object detection assessment may prevent the Power Transmitter from transmitting wireless power until an FOD fault status can be cleared. In the event that a Power Receiver is not present when the Power Transmitter is turned on, the initial idle phase foreign object detection assessment may successfully determine whether foreign objects are present or not.

After the initial idle phase foreign object detection assessment, the FOD assessment unit may perform subsequent foreign object detection assessments, such as in other operating phases. In the other operating phases, FOD assessment unit may adapt the plurality of offset values to account for system changes detected. Adaptation (sometimes also referred to as "recalibration") enables the FOD assessment unit to update the plurality of the offset values (for use in a subsequent foreign object detection assessment) to account for the system changes (such as movement of a Power Receiver) when a Power Receiver is detected and no foreign object is present. The updated offset values (sometimes also referred to as "adapted offset values") may be stored in a volatile memory such that they can be used while the Power Transmitter is on and are removed when the Power Transmitter is turned off. Each time the Power Transmitter is turned off and then on, the plurality of offset values are reset to the calibrated values. Adaptation happens after the FOD assessment unit detects a Power Receiver that is present on the interface surface, such as in the configuration phase, connected phase, or power transfer phase. The FOD assessment unit may carry out adaptation in the other operating phases to compensate for the presence or movement of the Power Receiver and when no foreign object is detected.

For each foreign object detection assessment, the FOD assessment unit may indicate a fault status (sometimes referred to as an "FOD fault") when a foreign object has been detected. A Power Transmitter or Power Receiver may control operations at different phases based on the fault status. This disclosure includes several examples of FOD fault handling that can be used when the FOD assessment unit determines an FOD fault, depending on the current phase of the WPT system. For example, an FOD fault may be indicated by a user interface of the Power Transmitter, the Power Receiver, or both. In some implementations, the FOD assessment unit may communicate a message to the Power Receiver, the Power Transmitter, a processor of the appliance that includes either the Power Transmitter or the Power Receiver, or any combination thereof. In some implementations, a user interaction (such as via a user interface of the PRx or PTx) can be used to override or clear an FOD fault. Alternatively, or additionally, an FOD fault status may be cleared by user intervention to remove the foreign object and the PRx from the operative environment of the WPT system.

Particular implementations of the subject matter described in this disclosure can be implemented to realize one or more of the following potential advantages. Foreign object detection can be accurately performed at different operating phases of a WPT system. For example, the FOD assessment unit may properly indicate an FOD fault when a foreign object is detected. And the FOD assessment unit may properly adjust the detection values to account for movement of a Power Receiver when no foreign object is present. Using the techniques in this disclosure, a WPT system can coordinate the FOD procedures and the operating phases. Furthermore, in some implementations, the FOD procedures can address some common user errors such as placement of a Power Receiver on the Power Transmitter before the WPT has an opportunity to check for foreign objects. Thus, the implementations of this disclosure can provide additional safety and reliability of wireless power transfer systems.

The following description is directed to certain implementations for the purposes of describing innovative aspects of this disclosure. However, a person having ordinary skill in the art will readily recognize that the teachings herein can be applied in a multitude of different ways. The described implementations can be implemented in any means, apparatus, system, or method for wireless power transfer.

FIG. 1 shows a block diagram of an example wireless power transfer system 100. The wireless power transfer system may include a Power Transmitter 102 and a Power Receiver 118. The Power Transmitter 102 may include one or more primary coils 110 that transmit wireless energy (as a wireless power signal) to one or more corresponding secondary coils 120 in the Power Receiver 118. A primary coil refers to a source of wireless energy (such as inductive or magnetic resonant energy producing an electromagnetic field) in the Power Transmitter. The primary coil 110 may be associated with a power signal generator 106. The primary coil 110 may be a wire coil which transmits wireless power (which also may be referred to as wireless energy or a wireless power signal). Together, the power signal generator and the primary coil may generate a primary magnetic field during wireless power transfer. The power signal generator 106 may include components (not shown) to provide power to the primary coil 110 causing the primary coil 110 to produce the wireless power signal. For example, the power signal generator 106 may include one or more switches, drivers, series capacitors, rectifiers or other components. The Power Transmitter 102 also may include a transmission controller 108 (sometimes also referred to as a PTX controller) that controls the components of the power signal generator 106. For example, the transmission controller 108 may determine an operating point (such as voltage or current) and control the power signal generator 106 according to the operating point.

In some implementations, the power signal generator 106, the transmission controller 108 and other components (not shown) may be collectively referred to as a power transmitter circuit. Some or all of the power transmitter circuit may be embodied as an integrated circuit (IC) that implements features of this disclosure for controlling and transmitting wireless power to one or more Power Receivers. The transmission controller 108 may be implemented as a microcontroller, dedicated processor, integrated circuit, application specific integrated circuit (ASIC) or any other suitable electronic device.

A power source 112 may provide power to the power transmitter circuit in the Power Transmitter 102. The power source 112 may convert alternating current (AC) power to direct current (DC) power. For example, the power source 112 may include a converter that receives an AC power from an external power supply (such as a supply mains) and converts the AC power to a DC power used by the power signal generator 106.

In some implementations, a first communication unit 142 may be coupled to the components of the power signal generator 106 or the primary coil 110 to send or receive communications via the wireless power signal. The first communication unit 142 may include logic for controlling one or more switches and other components that cause transmission and reception of wireless signals via the wireless power signal. For example, the first communication unit 142 may include modulators or demodulators that convert information to modulated signals added to the wireless power signal. In one example, the first communication unit 142 may convert data from the transmission controller 108 into a frequency shift key (FSK) modulated signal that is combined with the wireless power signal for a communication from the Power Transmitter 102 to the Power Receiver 118. In another example, the first communication unit 142 may sense load modulated amplitude shift key (ASK) signals from the power signal generator 106 or the primary coil 110 and demodulate the ASK signals to obtain data that the first communication unit 142 provides to the transmission controller 108.

In some implementations, the Power Transmitter 102 may include a wireless communication interface 114. The wireless communication interface 114 may be connected to a first communication coil 116 (which may be a coil or a loop antenna). The wireless communication interface 114 may include logic for controlling one or more switches and other components that cause transmission and reception of wireless communication signals via the first communication coil 116. In some implementations, the wireless communication interface 114 may support short range radio frequency communication (such as Bluetooth™) or Near-Field Communication (NFC). NFC is a technology by which data transfer occurs on a carrier frequency of 13.56 MHz. The wireless communication unit 114 also may support any suitable communication protocol.

The transmission controller 108 may detect the presence or proximity of a Power Receiver 118 using a variety of techniques. In some implementations, the presence or proximity of the Power Receiver 118 may be detected based on a load change in response to a periodic low power signal generated by the power signal generator 106 and the primary coil 110. In some implementations, the presence or proximity of the Power Receiver 118 may happen during a periodic pinging process of the wireless communication interface 114 in the Power Transmitter 102.

The transmission controller 108 may control characteristics of wireless power that the Power Transmitter 102 provides to the Power Receiver 118. After detecting the Power Receiver 118, the transmission controller 108 may receive information from a Power Receiver 118. For example, the transmission controller 108 may receive the information during a hand shaking process with the Power Receiver 118. The information may include information about the Power Receiver 118 (such as a power rating, load states, the manufacturer, the model, or parameters of the receiver when operating on a standard transmitter, among other examples). The transmission controller 108 may use this information to determine at least one operating control parameter (such as frequency, duty cycle, voltage, etc.) for wireless power it provides to the Power Receiver 118. To configure the wireless power, the transmission controller 108 may modify the frequency, duty cycle, voltage or any other suitable characteristic of the power signal generator 106.

The Power Receiver 118 may include a secondary coil 120, a rectifier 126, and a receiver controller 128. The secondary coil 120 may receive the wireless energy via the electromagnetic field. When the secondary coil 120 is aligned to the primary coil 110, the secondary coil 120 may generate an induced voltage based on a received wireless power signal from the primary coil 110. A capacitor (not shown) and a switch (not shown) may be in series between the secondary coil 120 and the rectifier 126. The rectifier 126 may rectify the induced voltage and provide the induced voltage to a load 130. In some implementations, the load 130 may be external to the Power Receiver 118 and coupled via electrical lines from the rectifier 126. In some implementations, the rectifier 126 may be absent and the induced voltage in the secondary coil 120 may be fed to the elements in series to the secondary coil 120 and the load 130.

A receiver controller 128 may be connected to the rectifier 126 and a second communication unit 152. The second communication unit 152 may be coupled to the components of the secondary coil 120 or the rectifier 126 to send or receive communications via the wireless power signal. The second communication unit 152 may include logic for controlling one or more switches and other components that cause transmission and reception of communication signals via the wireless power signals. For example, the second communication unit 152 may include modulators or demodulators that convert information to ASK or FSK modulated signals. In one example, the second communication unit 152 may convert data from the receiver controller 128 into an ASK modulated signal that used to load modulate the wireless power signal for a communication from the Power Receiver 118 to the Power Transmitter 102. In another example, the second communication unit 152 may sense FSK signals in the wireless power signal at the secondary coil 120 or the rectifier 126 and demodulate the FSK signals to obtain data that the second communication unit 152 provides to the receiver controller 128.

In some implementations, the Power Receiver 118 may include a wireless communication interface 132. The wireless communication interface 132 may contain modulation and demodulation circuits to wirelessly communicate via a second communication coil 134 (which may be a coil or a loop antenna). Thus, the receiver controller 128 may wirelessly communicate with the transmission controller 108 via the wireless communication interface 132 and the wireless communication interface 114 using NFC communications or Bluetooth.

In some traditional wireless power systems, a primary coil can transfer wireless energy to a secondary coil up to a rating predetermined by a wireless standard. For example, a low power wireless power signal may convey 5 Watts (5 W), 9 W, 12 W, or 15 W. A low power wireless power system may deliver up to 15 Watts of energy which is suitable for many electronic devices. Higher power wireless systems are being developed to support wireless power transmission to appliances or devices that require more power. For example, a high-power cordless kitchen transmitter may deliver power as high as 2.2 kW.

An interface surface 180 (sometimes also referred to as an "interface space") may demark a space between the Power Transmitter and the Power Receiver. For example, the interface surface may include a surface of the Power Transmitter on which the Power Receiver may be placed. A distance between the primary coil 110 and the secondary coil 120 may include a thickness of a surface in the interface surface. During wireless power transfer, the primary coil 110 may induce a magnetic field (referred to as the primary magnetic field) through the interface surface and into an operative environment in which the secondary coil is placed. Thus, the "operative environment" is defined by the primary magnetic field in the system, where the primary magnetic field of a primary coil 110 is detectably present and can detectably interact with the secondary coil or a foreign object 190 (shown as FO 190).

When a foreign object 190 is present in the operative environment of the WPT system, the foreign object 190 may experience an increase in temperature due to interaction with the magnetic field. Therefore, when a foreign object is detected, the Power Transmitter may discontinue generating the primary magnetic field or otherwise prevent the Power Transmitter from transferring sufficient amounts of energy in the foreign object to cause the foreign object to heat beyond a safe level. A WPT system may include a detection apparatus (sometimes also referred to as a foreign object detection mat or "FOD mat"). In some implementations, the detection apparatus may be integrated or coupled with the Power Transmitter 102 or the interface surface 180.

Figure 2:
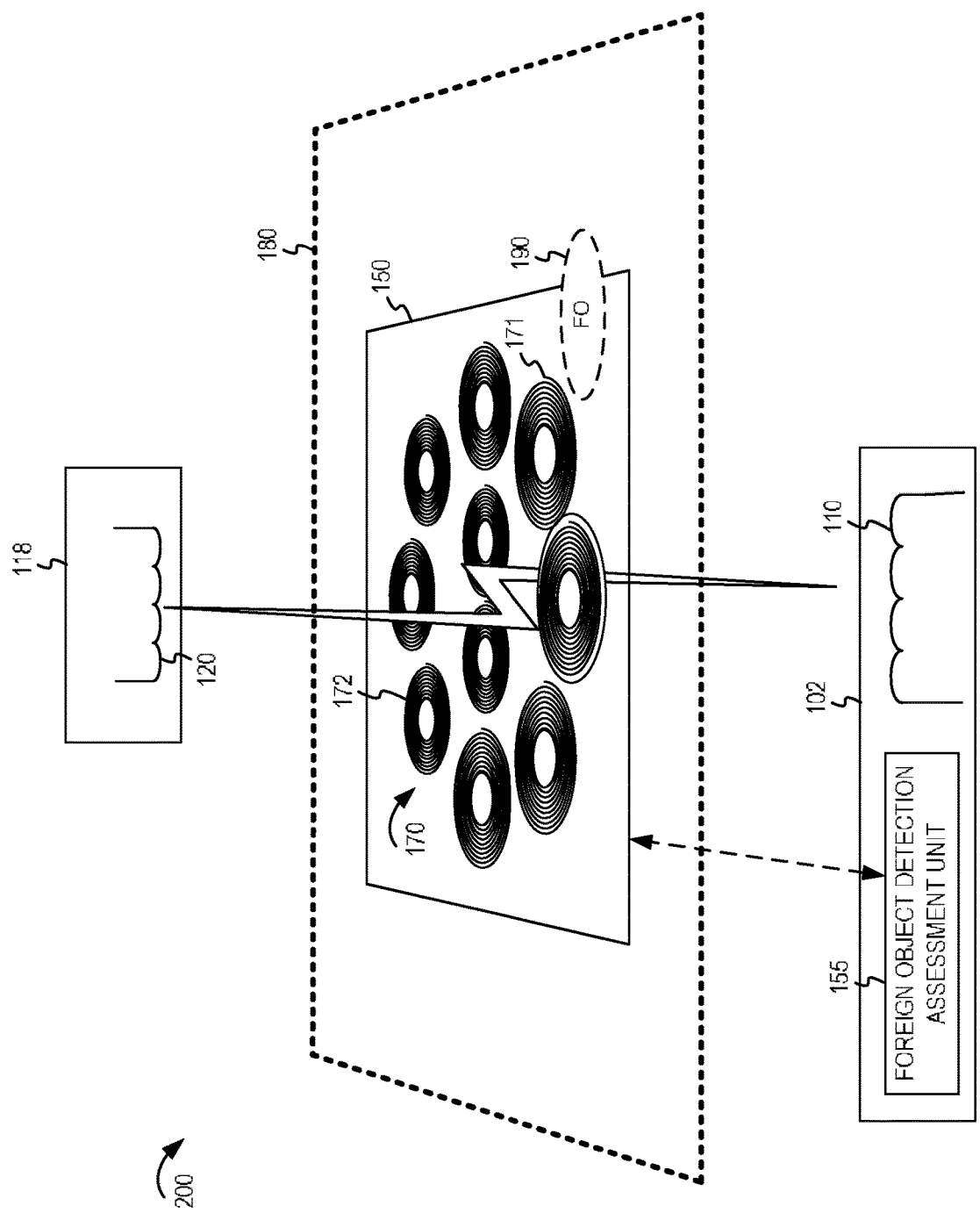
FIG. 2 shows a block diagram of an example wireless power transfer system with a detection apparatus for foreign object detection.

FIG. 2 shows a block diagram of an example wireless power transfer system 200 with a detection apparatus for foreign object detection. The wireless power transfer system 200 includes a Power Transmitter 102 (with a primary coil 110), an interface surface 180, and a Power Receiver 118 (with a secondary coil 120) as described with reference to FIG. 1. For brevity, other components of the Power Transmitter 102 and the Power Receiver 118 are not shown in FIG. 2. A detection apparatus (such as the FOD mat 150 shown in FIG. 2, or variations thereof) may include a plurality of detection coils 170 capable of detecting the presence of a foreign object in accordance with some aspects of this disclosure. In some implementations, the detection apparatus may include an FOD mat 150 and the detection coils may be constructed into or onto the FOD mat 150. Although not shown in FIG. 2, in some implementations, the FOD mat may extend for a full area of the interface surface. Alternatively, the FOD mat (and the quantity or configuration of the detection coils therein) may be sized based on a technical specification that defines the sizes of the primary coil 110, the secondary coil 120, or both. While the example in FIG. 2 shows the detection apparatus deployed as a FOD mat 150 in or on a surface, in some implementations the detection apparatus may be deployed on or in any surface or construction in the space between the primary coil 110 and secondary coil 120.

The WPT system may include an FOD assessment unit 155. In some implementations, the FOD assessment unit 155 may be part of the Power Transmitter 102 (as shown in FIG. 2). In some other implementations, the FOD assessment unit 155 may located elsewhere in the WPT system (such as in the detection apparatus, an FOD control unit (not shown), or as part of an appliance (not shown) that houses the Power Transmitter 102, among other examples. The FOD assessment unit 155 may be configured to detect a foreign object 190 in proximity to the detection coils 170 based on detection values, described further herein. In some implementations, the FOD assessment unit 155 may disable or enable the wireless power transfer operations of the Power Transmitter 102 based on an FOD assessment result. The FOD assessment result may indicate whether the FOD assessment unit 155 detects the foreign object 190 in proximity to the detection coils 170 or not. In some implementations, the FOD assessment unit 155 may communicate the FOD assessment result with the Power Receiver 118 to cause the Power Receiver 118 to enable or disable the wireless power transfer operations of the Power Receiver 118 based on the FOD assessment result. In some implementations, when the FOD assessment result is that a foreign object is detected, the FOD assessment result may be referred to as an FOD fault signal. Although only one FOD mat 150 is shown in FIG. 2, in some implementations, two or more FOD mats may be deployed in a WPT system. For example, the FOD assessment unit 155 may perform foreign object detection using FOD mats (not shown) located in relation to different primary coils of different Power Transmitters in a stove top or other wireless power appliance. Alternatively, or additionally, one FOD mat may be located in association with the Power Transmitter and another FOD mat may be located in association with the Power Receiver. Each of the FOD mats may be connected to the same or different foreign object assessment units (performing the functions described with reference to the FOD assessment unit 155 of FIG. 2).

The technique by which an FOD assessment unit 155 communicates an FOD assessment result with the Power Transmitter 102 or the Power Receiver 118 may vary. In some implementations, the FOD assessment unit 155 is implemented in a transmission controller (not shown) of the Power Transmitter 102 and may provide the FOD assessment result as information processed by the transmission controller. In some other implementations, the FOD assessment unit 155 may have a wired communication link (not shown) to the transmission controller of the Power Transmitter 102. In some implementations, the FOD assessment unit 155 may communicate by a wireless communication link (not shown) with the Power Transmitter 102 or the Power Receiver 118, or both. In implementations in which the FOD assessment unit 155 are not integrated in a transmission controller of the Power Transmitter 102, the transmission controller may manage the timing of FOD assessments performed by the FOD assessment unit 155. For example, the transmission controller may cause the FOD assessment unit 155 to perform FOD assessments during various operating phases of the WPT system. In some implementations, when the Power Transmitter 102 triggers FOD assessments, the Power Transmitter 102 may provide the FOD assessment unit 155 with an indicator of the current operating phase of the Power Transmitter or may indicate which type of FOD assessment for the FOD assessment unit 155 to perform. In some implementations, the FOD assessment unit 155 may communicate an FOD assessment result to the Power Transmitter 102 or the Power Receiver 118 using a memory storage unit, a pin line or other control signal without a need for a communication protocol. In some implementations, the FOD assessment unit 155 may be collocated or implemented as software within a controller of the Power Transmitter 102 or the Power Receiver 118.

The FOD mat 150 may be a flexible mat, a conformable mat, a rigid mat or a plug and play mat, a standalone mat, or combinations thereof. A substrate of the FOD mat 150 may be made of electrically insulating material. In some implementations, the FOD mat 150 may further include a mechanical wear resistant material to withstand movement of the Power Receiver over it (such as when the Power Receiver 118 is a large appliance). In some implementations, the FOD mat 150 may further be designed for outdoor application and designed to withstand temperature, humidity and may be resistant to water ingress. The detection coils 170 may be disposed on a substrate of the FOD mat 150 or may be embedded in the substrate of the FOD mat 150 for user safety and aesthetics. In some other embodiments, the detection coils 170 may be printed, molded, woven, or additively manufactured on the substrate of the FOD mat 150.

The detection coils 170 may be operated in pairs. The FOD assessment unit 155 may obtain the detection values (such as differential voltages, differential currents, or differential impedances, among other examples) associated with multiple coil pairs. Typically, a Power Receiver 118 is large enough that it will simultaneously span multiple coil pairs. Conversely, a foreign object 190 may be smaller than the Power Receiver 118. A foreign object 190 may span only one coil or may span two coils belonging to adjacent coil pairs. By comparing differences in the detection values in a pair of the detection coils, the FOD assessment unit 155 can detect the presence of a foreign object in the vicinity of the coil pair. For example, a first detection coil 171 and a second detection coil 172 may form a coil pair. The foreign object 190 near the first detection coil 171 may cause the detection values for the first detection coil 171 and the second detection coil 172 to differ. A detection apparatus (such as FOD mat 150) may have several such coil pairs and the FOD assessment unit 155 may compare respective detection values for the coils in each coil pair.

In an implementation that uses active excitation, the FOD assessment unit 155 may cause a driver (not shown) to excite the first detection coil 171 and the second detection coil 172 using a high frequency (higher than a frequency typically used for the primary magnetic field, such as 200 kHz or higher, as an example). The coil pair may be coupled in a parallel circuit to a driver that concurrently excites the detection coils of the coil pair. When present, the foreign object may cause the first detection coil 171 to experience a different impedance or current flow compared to the second detection coil 172 (where no foreign object is present). By comparing the current drawn through the first detection coil 171 and the second detection coil 172, the FOD assessment unit 155 may determine that the foreign object is present near the first detection coil 171 or the second detection coil 172. The difference in current drawn by a coil pair may be referred to as a differential current.

In an implementation that uses passive excitation, the FOD assessment unit 155 may observe voltages that are induced in detection coils based on the magnetic field produced by the primary coil 110. The detection coils in a coil pair may be connected in series and terminated by a known impedance. When the primary coil 110 is excited by the Power Transmitter 102, the magnetic field produced by the primary coil 110 may induce voltages in the detection coils of a coil pair. In the absence of a foreign object, the voltages in the detection coils may be uniform and effectively cancel out. Conversely, when a foreign object is present, the voltages in the detection coils are non-uniform and results in a differential voltage that can be measured. The differential voltage is an example of a detection value that can be adjusted using the offset values in various implementations of this disclosure.

Thus, the techniques of this disclosure can be used with detection apparatuses that use active excitation or passive excitation. For brevity, many of the examples in this disclosure are based on active excitation, but the same or similar concepts apply to a detection apparatus that uses passive excitation.

Figure 3:
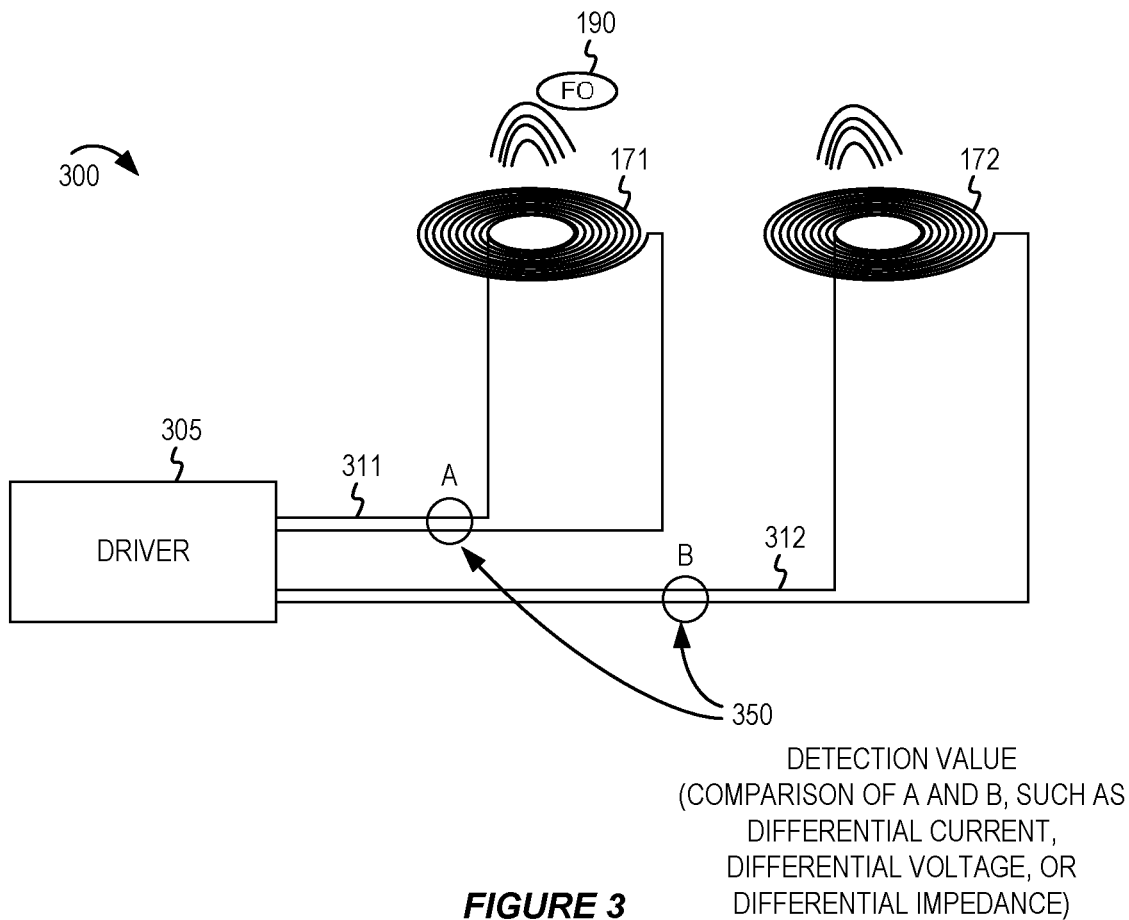
FIG. 3 shows a block diagram of an example detection apparatus in which a detection value is based on a comparison of coil circuits associated with a pair of detection coils

FIG. 3 shows a block diagram 300 of an example detection apparatus in which a detection value is based on a comparison of coil circuits associated with a pair of detection coils. FIG. 3 shows a coil pair comprising a first detection coil 171 and a second detection coil 172. The coil pair is connected in parallel to a driver 305. Thus, when one of the detection coils in the coil pair is excited, so is the other detection coil. A driver 305 may be operatively coupled to the coil pair (the first detection coil 171 and the second detection coil 172 in this example). The driver 305 may be configured to concurrently excite the detection coils 171 and 172 of the coil pair using an alternating current signal through coil circuits 311 and 312. For example, a first coil circuit 311 may include a path for electric current from the driver 305 through the first detection coil 171 and a second coil circuit 312 may include a path for electric current from the driver 305 through the second detection coil 172.

A sensing apparatus (not shown) or FOD assessment unit (not shown) may obtain a detection value 350 associated with the coil pair. For example, the detection value 350 may be a differential current, a differential voltage, or a differential impedance, among other examples. The detection value 350 represents a comparison of how electric current is conducted differently when comparing the first detection coil 171 and the second detection coil 172. For example, the detection value 350 may be a differential current representing a difference between a first current (referenced as "A" in FIG. 2) passing through the first coil circuit 311 and a second current (referenced as "B" in FIG. 2) passing through the second coil circuit 312.

The detection value 350 may be adjusted using offset values in accordance with the techniques of this disclosure. In some implementations, the impedance values of the first detection coil 171 and the second detection coil 172 may be the same or similar when a foreign object 190 is not present. However, when the foreign object 190 is present, the foreign object 190 may cause a change in impedance to one of the detection coils 171 and 172 such that the first detection coil 171 has a first impedance value and second detection coil 172 has a second impedance value. The difference in impedance may cause an amount of current drawn through the coil circuits 311 and 312 to differ. A differential current may refer to a comparison of the current drawn through the coil circuits 311 and 312. When the foreign object 190 is not present and the impedance of the detection coils 171 and 172 are same or similar, the amount of current drawn through the coil circuits 311 and 312 may be same or similar. Therefore, the detection value 350 may be a low value indicating little or no difference. Conversely, when the foreign object 190 is present near one of the first detection coil 171, the impedance of that first detection coil 171 will change causing the detection value 350 to indicate a higher difference in the current drawn through the coil circuits 311 and 312.

An FOD assessment unit (not shown) can obtain detection values (such as detection value 350) from multiple coil pairs of detection coils. The FOD assessment unit may distinguish between a movement of the Power Receiver versus introduction of a foreign object based on how many coil pairs have a change in detection values. For example, when the detection values for a threshold quantity of multiple coil pairs indicate a change in differential currents or differential voltages, the FOD assessment unit may determine that such changes are due to a movement of the Power Receiver. When the detection value for one or two coil pairs (or below a threshold quantity) indicates a change in differential current or differential voltage, the FOD assessment unit may determine that such change is due to the introduction of a foreign object. In such instances, the FOD assessment unit may send an FOD assessment result that indicates an FOD fault condition. In some implementations, the FOD assessment unit may modify or offset the detection values for multiple coil pairs in response to determining that a movement of the Power Receiver has occurred. Thus, for a subsequent comparison of the detection values, the FOD assessment unit can adjust the detection values to account for the previous movement of the Power Receiver within the magnetic field of the WPT system. Thus, the accuracy of a subsequent FOD assessment can be improved by accounting for the normal impedance impact of the Power Receiver while still providing an accurate technique for detecting a foreign object.

Figure 4:
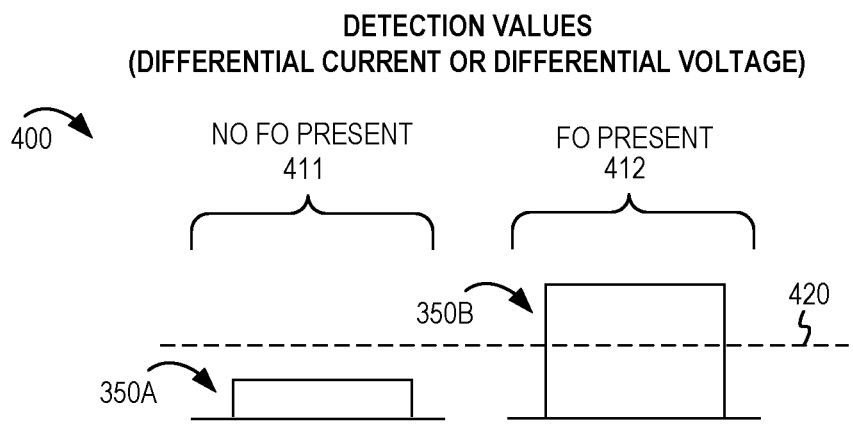
FIG. 4 shows a chart with example magnitudes of detection values.

FIG. 4 shows a chart 400 with example magnitudes of detection values. For example, FIG. 4 pictorially illustrates example magnitudes of differential currents 350A and 350B (as examples of the differential current 350 of FIG. 3) and how the differential current may can be used to determine whether a foreign object is present. When no foreign object is present (shown at graph 411), a magnitude of the differential current 350A may be lower than a detection threshold 420. When a foreign object is present (shown at graph 412), the magnitude of the differential current 350B may be above the detection threshold 420. The detection threshold 420 may be a configurable parameter based on a desired sensitivity of the FOD assessment unit.

In the example shown in FIG. 4, a foreign object is detected when the differential current is above a detection threshold. In some implementations, the foreign object is detected based on an amount of change in the differential current. For example, the differential current may be higher during a baseline state and then decrease below a threshold amount when the foreign object is detected. The differential current may become greater or may become lesser (compared to a previous measurement or a baseline measurement) when a foreign object is present. Thus, in some implementations, the amount of change in differential current can indicate the presence of a foreign object. A change in the amount of the differential current may be compared with a detection threshold to determine whether the change is based on the introduction of a foreign object.

Figure 5:
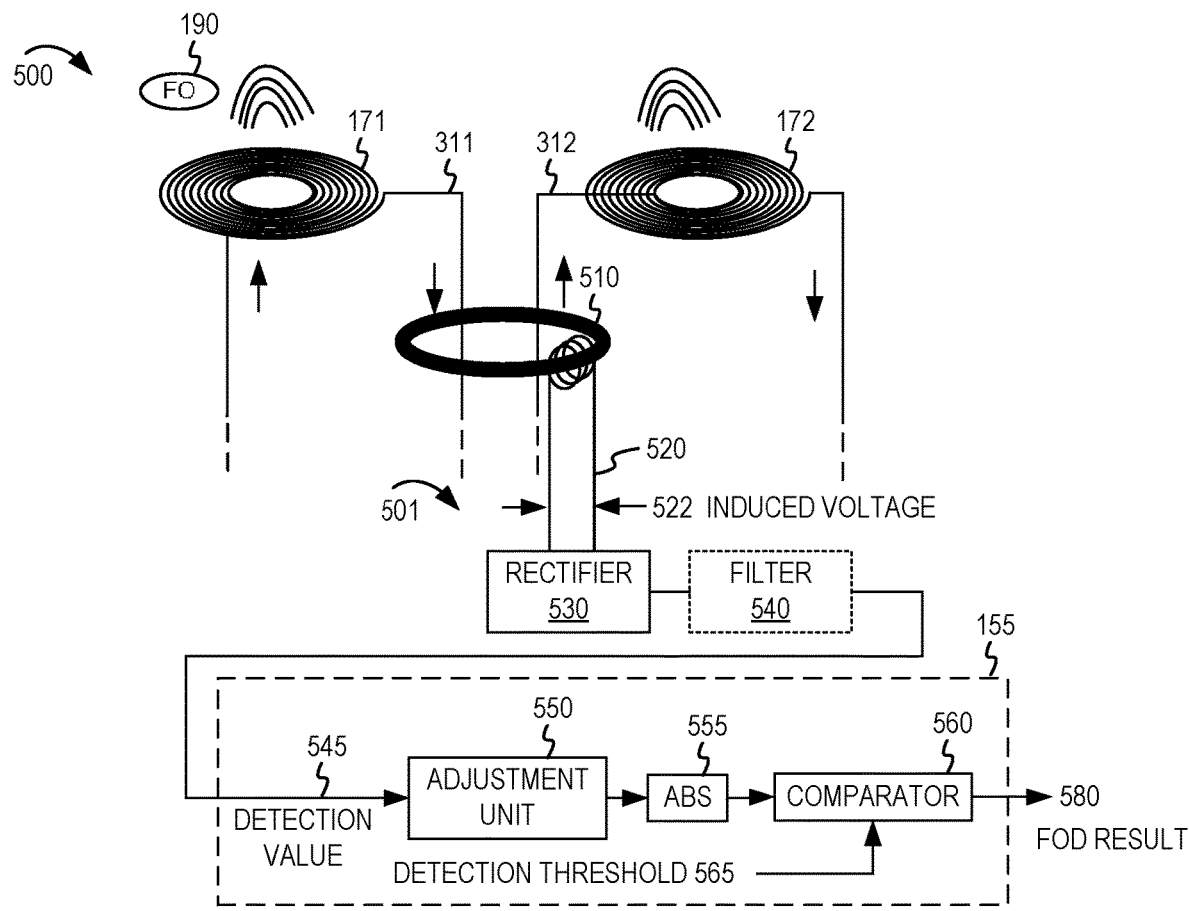
FIG. 5 shows a block diagram of an example detection apparatus in which a detection value is based on a voltage induced by a differential current.

FIG. 5 shows a block diagram of an example detection apparatus 500 in which a detection value is based on a voltage induced by a differential current. The example detection apparatus may include detection coils arranged in pairs as described herein. For example, the example detection apparatus may include a pair of detection coils 171 and 172 (referred to as a coil pair) as described with reference to FIG. 3. The detection apparatus may include a driver (not shown) configured to concurrently excite the coil pair during an FOD period. The presence (or lack thereof) of the foreign object 190 may cause a differential current in the coil circuits 311 and 312. FIG. 5 provides one example of a differential current sensing apparatus that can be used to measure the differential current. The differential current sensing apparatus may include a magnetic core 510 and a differential current sensing circuit 501, which work in combination to provide a voltage which can be measured to obtain a detection value 545.

When the currents on the coil circuits 311 and 312 are passed through a magnetic core 510, the difference in current generates a flux linkage in the magnetic core. The coil circuits 311 and 312 are passed through the magnetic core in opposite directions so that an equal current in the coil circuits 311 and 312 will generate a smaller flux linkage while differences in the current of the coil circuits 311 and 312 generate a greater flux linkage. The flux linkage in the magnetic core 510 may induce a corresponding electrical signal in a sensor coil 520 wound around the magnetic core 510. This induced electrical signal, under conditions of the magnetic core 510 not magnetically saturated, has an induced voltage 522 that is dependent on (such as related to or proportional to) the difference between current in the coil circuits 311 and 312 and is representative of a measure of the differential current between the coil pair of detection coils 171 and 172.

The differential current sensing circuit 501 also may include a rectifier 530 that receives and rectifies the induced electrical voltage signal to generate a DC voltage 545 (referred to as detection value 545). An optional filter 540 may filter the detection voltage before sending the detection voltage to the control unit 155. In one example, the filter 540 is configured to filter out high frequency components from the measurement.

An FOD assessment unit 155 may be configured to generate a foreign object detection assessment result 580 (FOD result) indicating the result of the foreign object detection assessment using the detection value 545. In some implementations, the FOD assessment unit 155 may include a comparator 560 configured to compare an absolute value of the detection value with a detection threshold 565. Based on the comparison of the detection value with the detection threshold 565, the FOD assessment unit 155 may provide an FOD assessment result 580 or other control signal to a component of the WPT system (such as a Power Transmitter or a Power Receiver). For example, when the absolute value of the detection value is greater than the detection threshold 565, the FOD assessment unit 155 may provide an FOD assessment result 580 that indicates a foreign object is present. Alternatively, the detection value in the presence of foreign object may be lower than the detection value when the foreign object is absent. Thus, in some implementations, a change in the absolute value of the detection voltage (from a previous or baseline measurement to the present measurement) may be compared with a delta threshold and a foreign object may be detected when the amount of change is greater than the delta threshold. The FOD assessment unit 155 may include a component (referred to as an absolute value unit or ABS 555) to generate the absolute value (referred to as the magnitude) of the detection value 545.

In some implementations, the FOD assessment unit 155 also may include an adjustment unit 550 configured to add or subtract offset values (sometimes referred to as an "offset" for brevity) to corresponding ones of the detection voltage. For example, the offset value may be based on a normal difference in impedance of the coil pair of detection coils 171 and 172 or may be based on results of a previous foreign object detection assessment. In some implementations, the initial offset value may be determined during or after manufacturing of the detection coils 171 and 172. Alternatively, or additionally, the initial offset value may be determined by the FOD assessment unit 155 or test equipment (not shown) during a baseline measurement of the detection apparatus when no foreign object is present. For example, the initial offset value may account for minor differences in impedance caused by other components of an FOD mat, a Power Transmitter, or a Power Receiver, depending on where the detection apparatus is installed. During a calibration of the FOD assessment unit 155, calibration values may be measured and stored for use as the initial offset values. During an initial idle phase foreign object detection assessment, the initial offset value (for each detection value) will be subtracted from the actual detection value and passed on to ABS 555. The comparator 560 may compare the absolute value generated by the ABS 555 with the detection threshold 565 to generate the FOD result 580.

In the idle phase, an initial idle phase foreign object detection assessment utilizes a plurality of offset values, referred to as initial offset values, which are based on the calibration values. In the other operating phases, a Power Receiver is present in the interface surface. The FOD assessment unit 155 may adapt the plurality of offset values to account for detection of a movement of the Power Receiver on the interface surface when no foreign object is present. For example, the detection value may be used as an updated offset value associated with that coil pair for use in a subsequent foreign object detection assessment (such as in the configuration phase, connected phase, or power transfer phase). The updated offset value may reflect the change in impedance that is attributed to movement of the Power Receiver. In the subsequent foreign object detection assessment, the updated offset value is used by the adjustment unit 550 to adjust the detection value 545.

Figure 6:
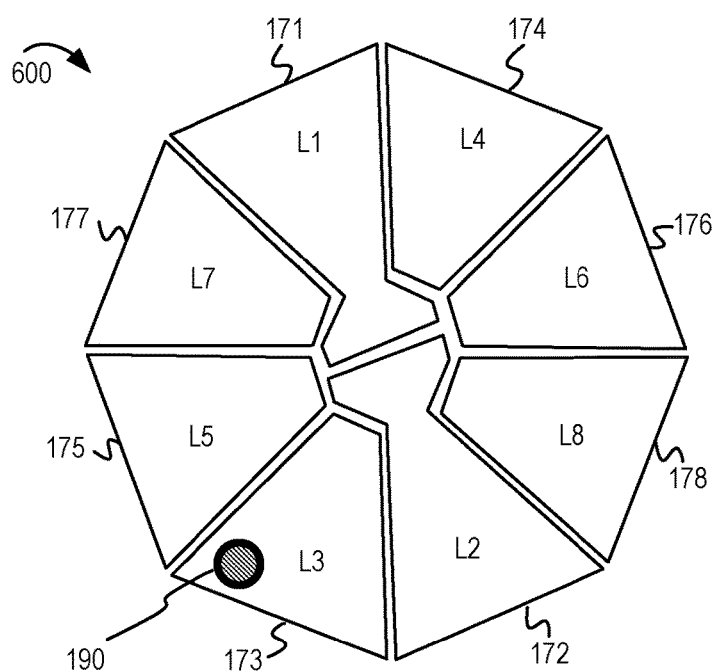
FIG. 6 shows a diagram of a plurality of detection coils in an example detection apparatus.

FIG. 6 shows a diagram 600 of a plurality of detection coils in an example detection apparatus. Four coil pairs are shown. A first coil pair comprises first and second detection coils 171 and 172. A second coil pair comprises third and fourth detection coils 173 and 174. A third coil pair comprises fifth and sixth detection coils 175 and 176. A fourth coil pair comprises seventh and eighth detection coils 177 and 178. It should be apparent that the example of FIG. 6 is provided for pedagogical purposes and a detection apparatus may have any variety of coil pairs. For brevity, the detection coils 171, 172, 173, 174, 175, 176, 177 and 178 are referred to as L1, L2, L3, L4, L5, L6, L7 and L8, respectively.

During a foreign object detection assessment, one or more coil pairs may be actively or passively excited such that a detection value can be obtained for each coil pair. In some implementations, the coil pairs may be excited in a sequential pattern so that its related detection value may be measured absent from interference of the other coil pairs. In some implementations, two or more coil pairs having non-adjacent detection coils may be excited and measured concurrently.

FIG. 6 also shows an example in which a foreign object 190 is located in proximity to coil L3. When the coil pair of coils L3 and L4 are excited, those detection coils will draw different currents and the detection value may be indicative that the foreign object is located near one of those coils.

Figure 7:
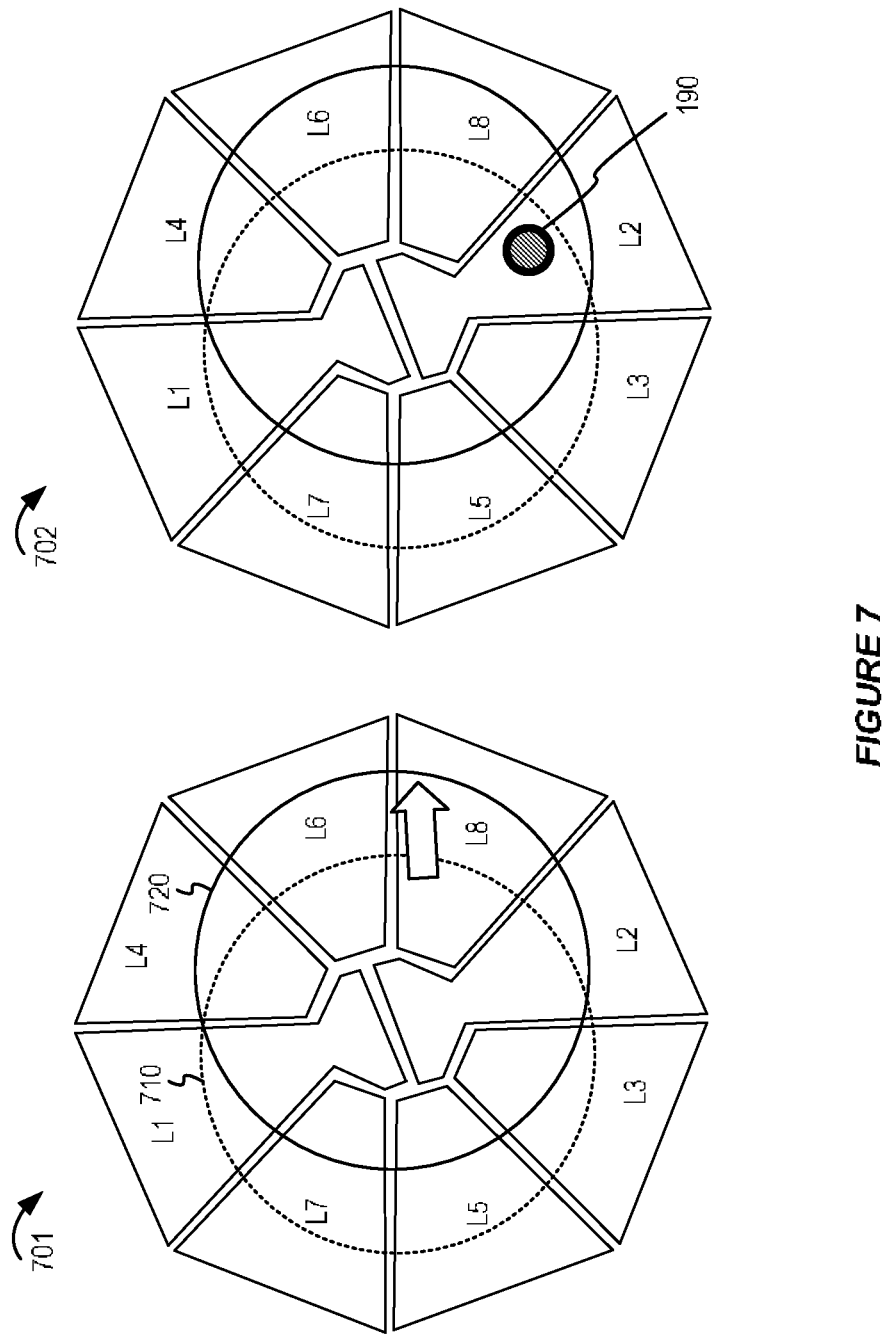
FIG. 7 shows a diagram of multiple coil pairs capable of distinguishing between movement of a Power Receiver or a presence of a foreign object.

FIG. 7 shows a diagram of multiple coil pairs capable of distinguishing between movement of a Power Receiver or presence of a foreign object. The layout of FIG. 7 utilizes the example configuration of multiple coil pairs described with reference to FIG. 6. A primary coil (not shown) may be positioned centered and underneath the detection zones covered by coils L1-L8. A first example 701 illustrates a secondary coil (shown by a single circle, for brevity) that moves from a first position 710 to a second position 720 over the array of detection coils. Because the secondary coil includes metallic and ferrite components, the secondary coil may cause a change in impedance of the detection coils. Thus, when the detection values of the coil pairs are measured, the secondary coil itself may cause a disparity in the detection values associated with some coil pairs. However, because the secondary coil is relatively large compared to the size of the detection coils, multiple coil pairs will measure the change in detection value. By comparison, a second example 702 illustrates a foreign object 190 introduced in the operating environment of the WPT system. The foreign object is relatively small compared to the size of the detection coils. Thus, perhaps only one or two coil pairs may measure a change in detection value due to the introduction of the foreign object. In some implementations, the size of the detection coils L1-L8 (and their sub coils) may be selected based on a standardized size (or sizes) of a secondary coil that conforms to a technical specification. Similarly, the size of the detection coils L1-L8 may be selected based on a potential size of foreign objects that are likely to be introduced into the operating environment. For example, a detection apparatus for use in a kitchen WPT system may include detection coils that are sized appropriately to detect a spoon, fork, coin, key, tin can, or metal plate, among other examples. A detection apparatus for use in an EV WPT system may include detection coils that are sized appropriately to detect a wrench, aluminum can, gas tank, washer, nut, or screw, among other examples. A detection apparatus for use in a desktop WPT system may include detection coils that are sized appropriately to detect foreign object (such as a pen, keys, computer component, ring, or thumb drive, among other examples).

Figure 8:
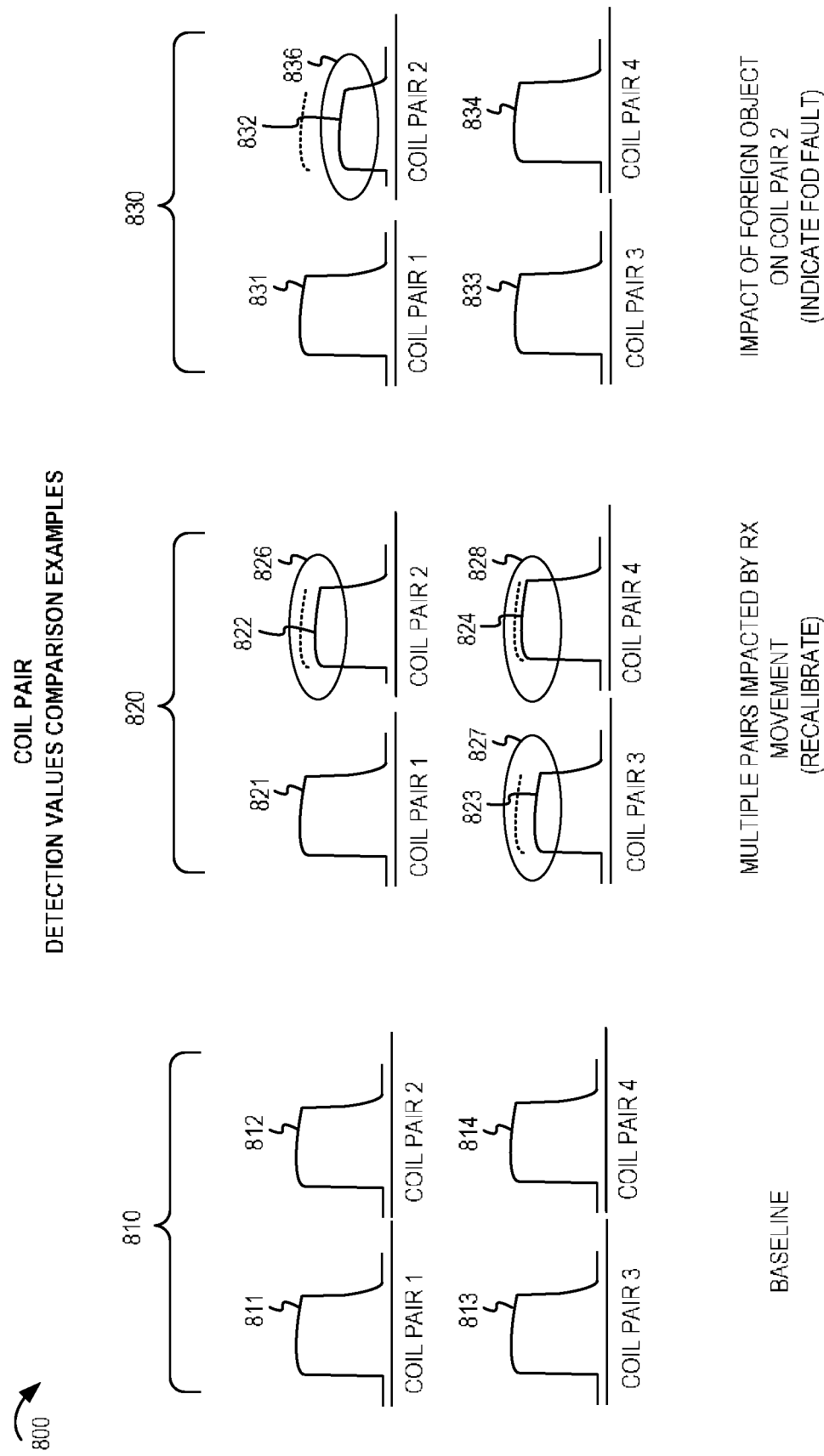
FIG. 8 shows example charts comparing detection voltages of coil pairs due to movement of a Power Receiver versus presence of a foreign object.

FIG. 8 shows example charts 800 comparing detection values of coil pairs due to movement of a Power Receiver versus presence of a foreign object. In a first example 810, an FOD assessment unit (such as the FOD assessment unit 155 described with reference to any of the Figures herein) may establish a baseline representation of the detection voltages (having been adjusted by initial offset values based on calibration values). For example, in the idle phase, the FOD assessment unit may add initial offset values to the detection values for each coil pair based on calibration values. The detection values 811, 812, 813 and 814 may represent measurements of the differential currents (or differential voltages) of multiple coil pairs. The FOD assessment unit may determine that no foreign object is present based on the detection values (having been adjusted by the initial offset values). For example, the FOD assessment unit may compare each detection value with a detection threshold and determine, for each coil pair, that no foreign object is present. Alternatively, or additionally, the detection FOD assessment unit may compare an amount of change for each detection value with a delta threshold and determine that no foreign object is present when the amount of change is below the delta threshold. In other operating phases, in which a Power Receiver is present, and no foreign object is detected, the FOD assessment unit may adapt the plurality of offset values based on changes in impedance caused by movement of the Power Receiver. In the other operating phases, the updated offset values may be used to adjust the detection values for the coil pairs during a subsequent foreign object detection assessment.

In a second example 820 (such as a subsequent foreign object detection assessment), the Power Receiver may have moved from a previous location associated with a previous assessment. That movement may cause a change in the detection values for the coil pairs. For example, the detection values 821, 822, 823 and 824 may represent measurements of the differential currents (or differential voltages) of multiple coil pairs during the subsequent foreign object detection assessment. In the second example, the detection values 822, 823 and 824 corresponding do the second, third, and fourth coil pair has changed. The changes in the detection values 822, 823, and 824 are circled at 826, 827, and 828, respectively, for the benefit of this description. Although illustrated as a decrease in detection values (circled at 826, 827, and 828) for pedagogical purposes, in some implementations the change may be an increase in detection values. Regardless of whether the change is an increase or a decrease, the FOD assessment unit may determine how many coil pairs have had a change in detection value that is more than a delta threshold. The FOD assessment unit may determine that the changes are due to movement of the Power Receiver because more than a threshold quantity of coil pairs have had a change in their respective detection values. The threshold quantity may be a configurable parameter or may be predetermined. In some implementations, a change in three or more coil pairs may be deemed to be due to a movement of the Power Receiver during wireless power transfer. Once the FOD assessment unit has determined that a change in the detection values is due to a movement of the Power Receiver, the FOD assessment unit may adapt the offset values to account for a new position of the Power Receiver. In some implementations, the offset values may be adapted whenever the result of a foreign object detection assessment is determined to be based on a movement of the Power Receiver.

In a third example 830, a foreign object may be introduced into the operating environment during wireless power transfer. The detection values 831, 832, 833 and 834 may represent measurements of the differential currents (or differential voltages) of multiple coil pairs. In the third example, the detection value 832 of the second coil pair has changed. The change in the detection value 832 is circled at 836 for the benefit of this description. Because the quantity of coil pairs having a change in detection value is less than a threshold quantity, the FOD assessment unit may determine that the change is due to a foreign object introduced in proximity to the detection coils of the second coil pair. The FOD assessment unit may send an FOD fault signal or control signal to the WPT system to indicate that a foreign object may be present.

Figure 9:
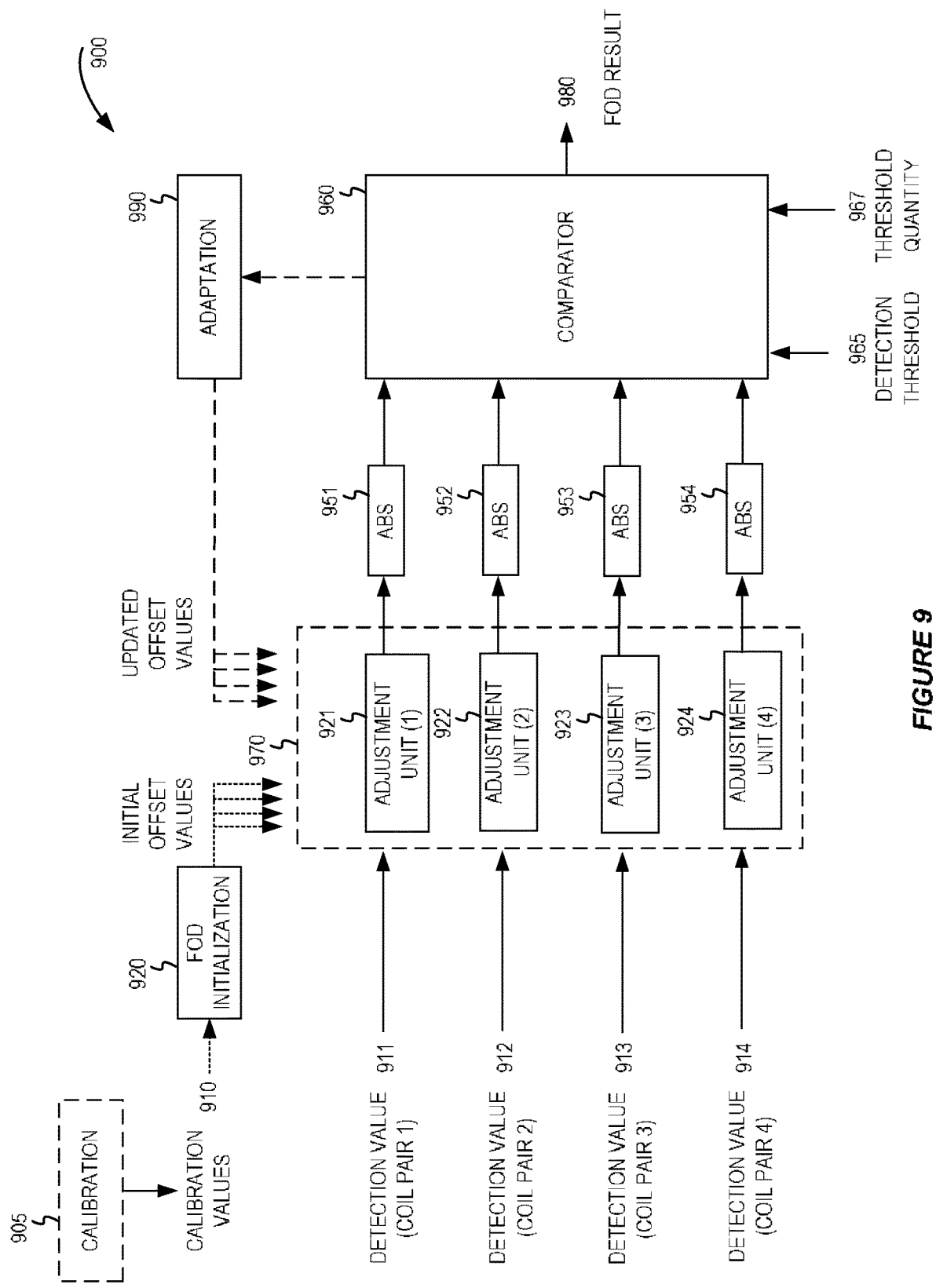
FIG. 9 shows a block diagram of an example foreign object detection assessment in which detection values are adjusted based on offset values.

FIG. 9 shows a block diagram 900 of an example foreign object detection assessment in which detection values are adjusted based on offset values. The block diagram 900 may describe features of an FOD assessment unit (such as any of the FOD assessment units described herein, including FOD assessment unit 155). At some point prior to a foreign object detection assessment (such as during an installation or servicing of the Power Transmitter), a calibration process 905 may be performed to determine calibration values 910. The calibration values 910 represent a baseline measurement of impedance differences among the coil pairs at a moment when no foreign objects or Power Receivers are present in the interface surface. The calibration values 910 may be stored in a non-volatile memory associated with the FOD assessment unit so that they remain even when the Power Transmitter and FOD assessment unit are turned off. When the Power Transmitter is turned on, the FOD assessment unit undergoes an FOD initialization 920 in which the calibration values 910 are retrieved from the non-volatile memory and used as initial offset values for the corresponding adjustment units 921, 922, 923, and 924.

In the example scenario described with reference to FIG. 9, the FOD assessment unit may be configured to receive detection values 911, 912, 913, and 914 associated with first, second, third, and fourth coil pairs, respectively. For example, the detection values may be a differential voltage, differential current, or differential impedance describing a difference in the energy flowing through the detection coils of a coil pair that are actively or passively excited. Each of the detection values may be obtained using sensing circuits associated with the coil pairs. The detection values 911, 912, 913, and 914 may be adjusted using adjustment units 921, 922, 923, and 924, respectively. Each adjustment unit 921, 922, 923, and 924 may adjust a corresponding detection values 911, 912, 913, and 914 by adding or subtracting a corresponding offset value. In the initial idle phase foreign object detection assessment, the offset values (referred to, collectively, as offset values 970) may be based on the initial offset values obtained during FOD initialization 920. After the detection values 911, 912, 913, and 914 have been adjusted by adjustment units 921, 922, 923, and 924, respectively, ABS's 951, 952, 953, and 954, respectively, may generate the absolute values (magnitudes) of the adjusted detection values. A comparator 960 may compare each adjusted detection value with a detection threshold 965 to determine whether a foreign object is located near a detection coil of a particular coil pair. In some implementations, such as for an initial idle phase foreign object detection, if any one of the detection values is above the detection threshold, the comparator may send an FOD result 980 indicating an FOD fault signal. In a foreign object detection assessment in other operating phases, the comparator may determine a quantity of the adjusted detection values that are above the detection threshold 965. For example, the comparator may determine a change count indicating how many of the adjusted detection values (corresponding to respective coil pairs) are above the detection threshold 965. If the change count is above a threshold quantity 967, the comparator may determine that the changes are due to a movement of the Power Receiver. In this situation, the FOD assessment unit may perform an adaptation 990 to adapt the offset values 970 for use with a subsequent foreign object detection assessment. Alternatively, if the change count is below the threshold quantity 967, the FOD assessment unit may determine that the FOD result 980 should indicate presence of a foreign object. For the initial idle phase foreign object detection assessment, the threshold quantity 967 may be disabled, or otherwise set to a high value, such that no change count will be interpreted as a movement of a Power Receiver. In the idle phase, when at least one of the adjusted detection values is above the detection threshold 965, the FOD result 980 may indicate an FOD fault status. In other operating phases, the threshold quantity 967 may be a configurable value (such as 3 or 4) so that when multiple ones of the adjusted detection values are above the detection threshold 965, the FOD assessment unit may determine that the FOD result 980 should indicate no foreign object present and may perform the adaptation 990 to update the offset values 970 for use in a subsequent foreign object detection assessment.

The FOD result 980 may include a first state that indicates no foreign object detected and a second state that indicates a foreign object has been detected. In some implementations, when the FOD result 980 indicates a foreign object is detected, the FOD result 980 may also be referred to as an FOD fault status signal, an FOD fault indication, or term to indicate an FOD fault to the Power Transmitter or Power Receiver). In some implementations, the FOD fault indication will result in the Power Transmitter stopping or reducing the power to the Power Receiver. In some implementations, the FOD fault indication may be presented via a user interface associated with either the Power Transmitter or the Power Receiver.

Figure 10:
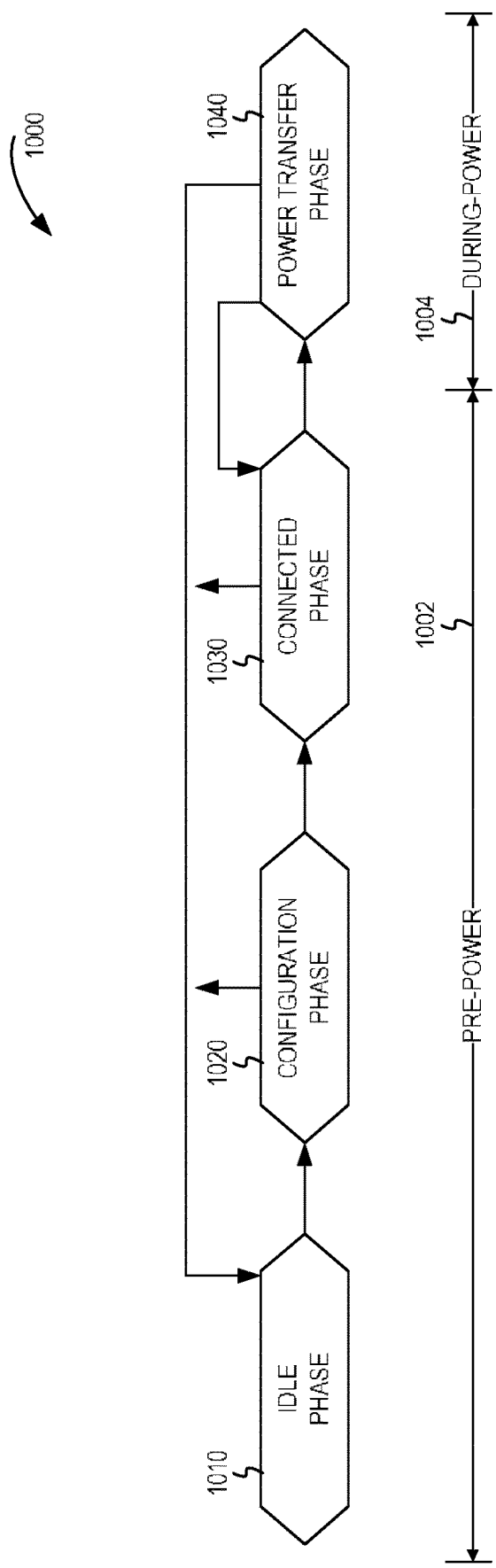
FIG. 10 shows a state diagram of various operating phases of a WPT system.

FIG. 10 shows a state diagram 1000 of various operating phases of a WPT system. The state diagram 1000 illustrates the operating phases in which the WPT system may operate. When a Power Receiver is placed within an interface surface of a Power Transmitter, the two start to communicate with the aim to configure and control the power transfer. There can be four operating phases associated with the WPT system: an idle phase 1010 (sometimes also referred to as a ping phase), a configuration phase 1020, a connected phase 1030, and a power transfer phase 1040. A technical specification may define how the Power Transmitter and Power Receiver can transition between the operating phases. For example, the WPT system typically begins in the idle phase 1010, and can transition from the idle phase 1010 to the configuration phase 1020. From the configuration phase 1020, the WPT system can transition to the connected phase 1030. From the connected phase 1030, the WPT system can transition to the power transfer phase 1040. Furthermore, the WPT system can transition back to the idle phase 1010 from any of the other phases (the configuration phase 1020, the connected phase 1030, or the power transfer phase 1040), such as when a Power Receiver is removed from the interface surface. Each of the operating phases are briefly described herein for reference.

In the idle phase 1010 (ping phase), the Power Transmitter tries to establish communications with a Power Receiver. The Power Receiver may be just placed on the interface surface or may not be present during this operating phase. The Power Transmitter may attempt to communicate or detect the presence of the Power Receiver. For example, the Power Transmitter may use an analog ping, out-of-band communication (such as NFC), a digital ping, or any combination thereof, to determine that a compatible Power Receiver is present. Once the WPT system determines that a Power Receiver is present (such as by confirming NFC communication), the WPT system may transition to the configuration phase 1020.

In the configuration phase 1020, the Power Receiver may send basic identification and configuration data to the Power Transmitter. For example, the Power Transmitter may retrieve static configuration information from the Power Receiver via the NFC communication. The Power Transmitter and the Power Receiver may use this information to verify that they both use compatible versions of a technical specification or protocol for wireless power transfer. The Power Transmitter and Power Receiver may communicate basic settings or communicate regarding their respective capabilities. From the configuration phase 1020, the WPT system may transition to the connected phase 1030.

In the connected phase 1030, the Power Transmitter and the Power Receiver may exchange further communications to negotiate the parameters that govern the power transfer phase. After negotiating the parameters, the Power Transmitter may be prepared to transfer wireless power and the Power Receiver may be prepared to receive the wireless power. However, the Power Transmitter may wait for a request or command from the Power Receiver before transitioning to the power transfer phase 1040. This may be useful, for example, when a cordless appliance (such as a blender, toaster, mixer, or microwave, among other examples) is configured for use pending a user interaction. The user may initiate the power transfer phase 1040 by a user interface of the Power Receiver, which in turn communicates to the Power Transmitter to transition to the power transfer phase 1040.

In the power transfer phase 1040, the Power Transmitter may transfer wireless power to the Power Receiver. Typically, the Power Transmitter will periodically perform a foreign object detection assessment during the power transfer phase 1040. In some, the Power Transmitter may perform a foreign object detection assessment to ensure that no foreign objects are present before transitioning from the connected phase 1030 to the power transfer phase 1040. The Power Transmitter also may perform periodic foreign object detection assessments during the power transfer phase 1040.

The idle phase 1010, the configuration phase 1020, and the connected phase 1030 may be collectively referred to as pre-power phases 1002, while the power transfer phase 1040 may be referred to as a during-power phase 1004. Traditional implementations of WPT systems typically describe foreign object detection assessments in the during-power phase 1004. However, such implementations may be inadequate to detect and properly handle issues that can arise by the presence of a foreign object in the pre-power phases 1002. Furthermore, even when a foreign object detection assessment is performed during one of the pre-power phases 1002 (such as the idle phase 1010), traditional WPT systems do not contemplate how the foreign object detection assessments are coordinated among the various operation phases as the Power Transmitter transitions between them.

Figure 11:
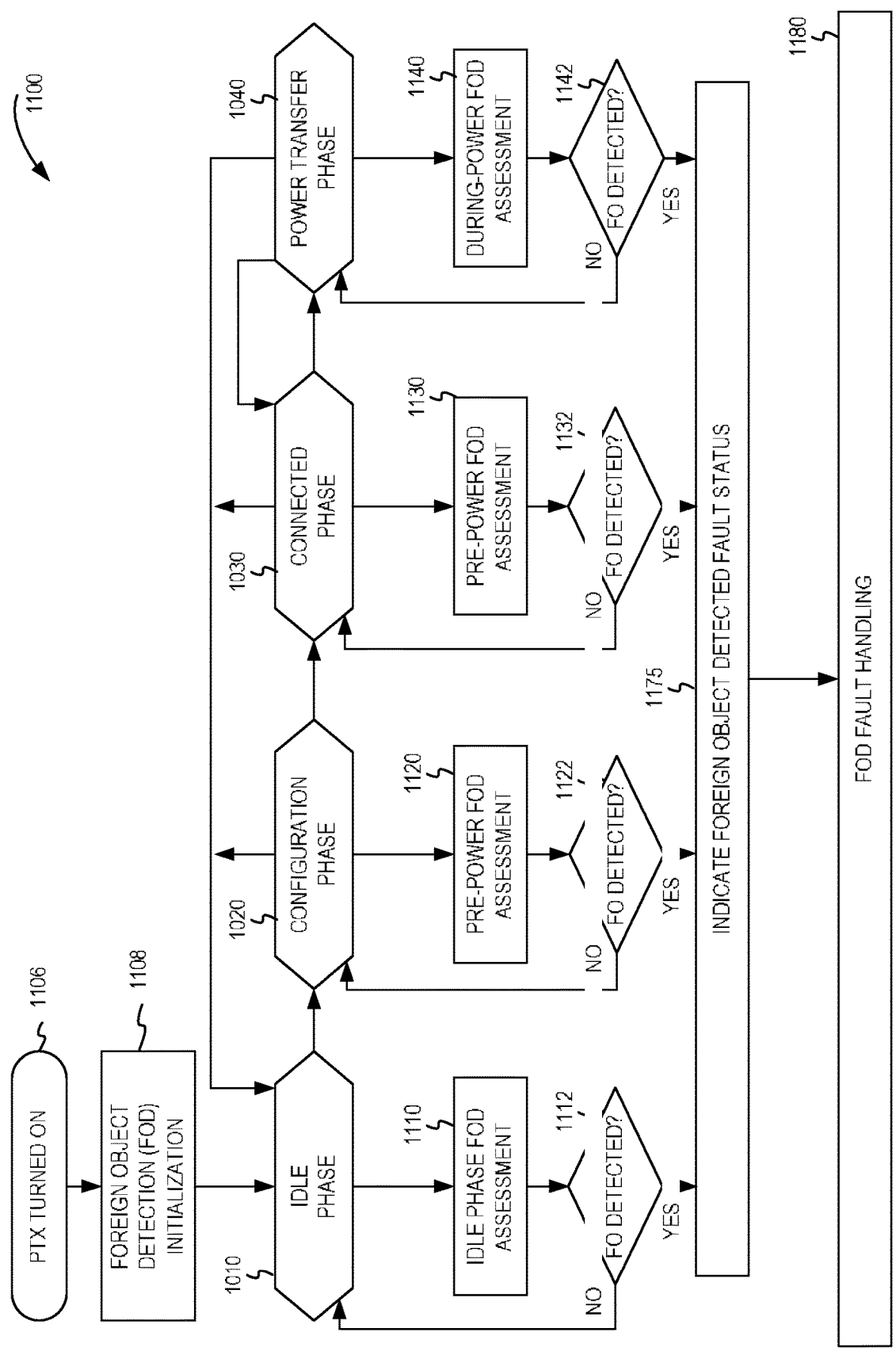
FIG. 11 shows an overview diagram of foreign object detection assessments in relationship to the various operating phases of a WPT system.

FIG. 11 shows an overview diagram 1100 of foreign object detection assessments in relationship to the various operating phases of a WPT system. The overview diagram 1100 includes the idle phase 1010, the configuration phase 1020, the connected phase 1030, and the power transfer phase 1040, as described with reference to FIG. 10. In accordance with this disclosure, foreign object detection assessments (shown as idle phase FOD assessment 1110, pre-power FOD assessments 1120 and 1130, and during-power FOD assessment 1140) can be performed in association with multiple (or all) of the operating phases 1010, 1020, 1030, and 1040. In some implementations, the foreign object detection assessments may be a precondition before transitioning to a next operating phase. When a foreign object is detected during any of the foreign object detection assessments, an FOD assessment unit may indicate an FOD fault. This application describes various FOD fault handling 1180 options, some of which may depend on which operating phase the WPT system was performing when the foreign object is detected.

In some implementations, the FOD assessment unit may perform a foreign object detection initialization 1108 after the Power Transmitter is turned on (shown at block 1106) and before (or as part of) the idle phase 1010. In some implementations, the Power Transmitter may initialize the FOD assessment unit to prompt an idle phase FOD assessment. During the FOD initialization 1108, the FOD assessment may obtain the calibration values (such as from a non-volatile memory) and load them as initial offset values in the FOD assessment unit settings for an initial idle phase foreign object detection assessment 1110. In some implementations, foreign object detection initialization 1108 may include setting a status indicator (referred to as an FOD flag)

to maintain a status regarding whether the initial idle phase foreign object detection assessment has been performed. For example, the FOD assessment unit may "set" the FOD flag to a first value (such as "1" or "true") may represent that the initial idle phase foreign object detection assessment (after powering on the Power Transmitter) has not yet been performed. Conversely, the FOD assessment unit may "clear" the FOD flag by resetting it to a second value (such as "0" or "false") to represent that the initial idle phase foreign object detection assessment (after powering on the Power Transmitter) has been performed. The example first and second values for the FOD flag are provided here as non-limiting examples. The FOD flag (in addition to the FOD fault status) may control how the WPT system transitions between the various operating phases.

In relationship to the idle phase 1010 (particularly before a Power Receiver is placed in the interface surface of the Power Transmitter), the FOD assessment unit may perform an idle phase FOD assessment 1110. For an idle phase FOD assessment 1110, the FOD assessment unit may indicate an FOD fault status when any one or more of the detection values (having been adjusted by the initial offset values associated with calibration values stored in a non-volatile memory) are above the detection threshold. Thus, the idle phase FOD assessment 1110 may differ from FOD assessments in other operating phases (such as the pre-power FOD assessments 1120 and 1130 or the during-power FOD assessment 1140) in that the idle phase FOD assessment 1110 does not attempt to account for movement of a Power Receiver and a lower threshold quantity of detection value comparisons will trigger an FOD fault status. If a foreign object is detected (at block 1112), the FOD assessment unit may indicate an FOD fault status (shown at block 1175) and proceed to one of several FOD fault handling options 1180, as described further with reference to FIG. 14. Alternatively, if no foreign object is detected (at block 1112), the FOD assessment unit may clear the FOD fault status (and also may clear the FOD flag that was set during the FOD initialization) such that the WPT system may continue operating in the idle phase 1010 or transition to the configuration phase 1020 when a Power Receiver is placed on the interface surface. As a reminder, the FOD flag is used by the FOD assessment unit to store and indicate whether the initial idle phase foreign object detection assessment has been performed after the Power Transmitter has been turned on. The FOD flag is set during the FOD initialization (in relation to the Power Transmitter being turned on) and is cleared once the initial idle phase foreign object detection assessment has been performed.

The FOD assessment unit is capable of handling various scenarios, such as a first scenario when no Power Receiver is placed on the interface surface before the Power Transmitter is turned on and a second scenario when a Power Receiver is placed on the interface surface before the Power Transmitter is turned on. In both scenarios, the FOD assessment unit may use the initial offset values (based on calibration values) for idle phase FOD assessments. In an idle phase FOD assessment 1110, the FOD assessment unit may indicate an FOD fault status indication when it detects a disparity above a detection threshold in at least one of the detection values for any coil pair. In the scenario when a Power Receiver is placed on the interface surface before the Power Transmitter is turned on, the FOD assessment unit will not clear the FOD flag set during the FOD initialization and will indicate an FOD fault status which can either be cleared by user action (such as using a switch or user interface) or by the user removing the Power Receiver (and foreign object, if present) for a brief period of time and returning the Power Receiver after the FOD assessment unit has performed the initial idle phase foreign object detection assessment.

Recall that the idle-phase FOD assessment 1110 may use initial offset values based on calibration values stored in a non-volatile memory. The FOD assessment unit may perform foreign object detection assessments 1120, 1130, 1140 (and corresponding blocks 1122, 1132, 1142) in relation to the configuration phase 1020, the connected phase 1030, and the power transfer phase 1040, respectively. In each operating phase other than the idle phase, a Power Receiver is present and the FOD assessment unit may determine whether a foreign object is present based on a criteria that can distinguish between foreign objects and system changes, such as a movement of the Power Receiver. For example, movement of the Power Receiver may be detected when multiple adjusted detection values have changed (in comparison to a detection threshold). Conversely, a foreign object may be detected when one (or less than a threshold quantity) of adjusted detection values have changed (in comparison to a detection threshold). When the FOD assessment unit determines there is no foreign object present, the FOD assessment unit may adapt the offset values to account for the system changes. After the adaptation, the updated offset values may be used in a subsequent foreign object detection assessment, including those associated with a later operating phase of the WPT system. In some implementations, the updated offset values (based on adaptation for present system changes unrelated to the presence of a foreign object) may be maintained in a volatile memory associated with the FOD assessment unit.

Figure 12:
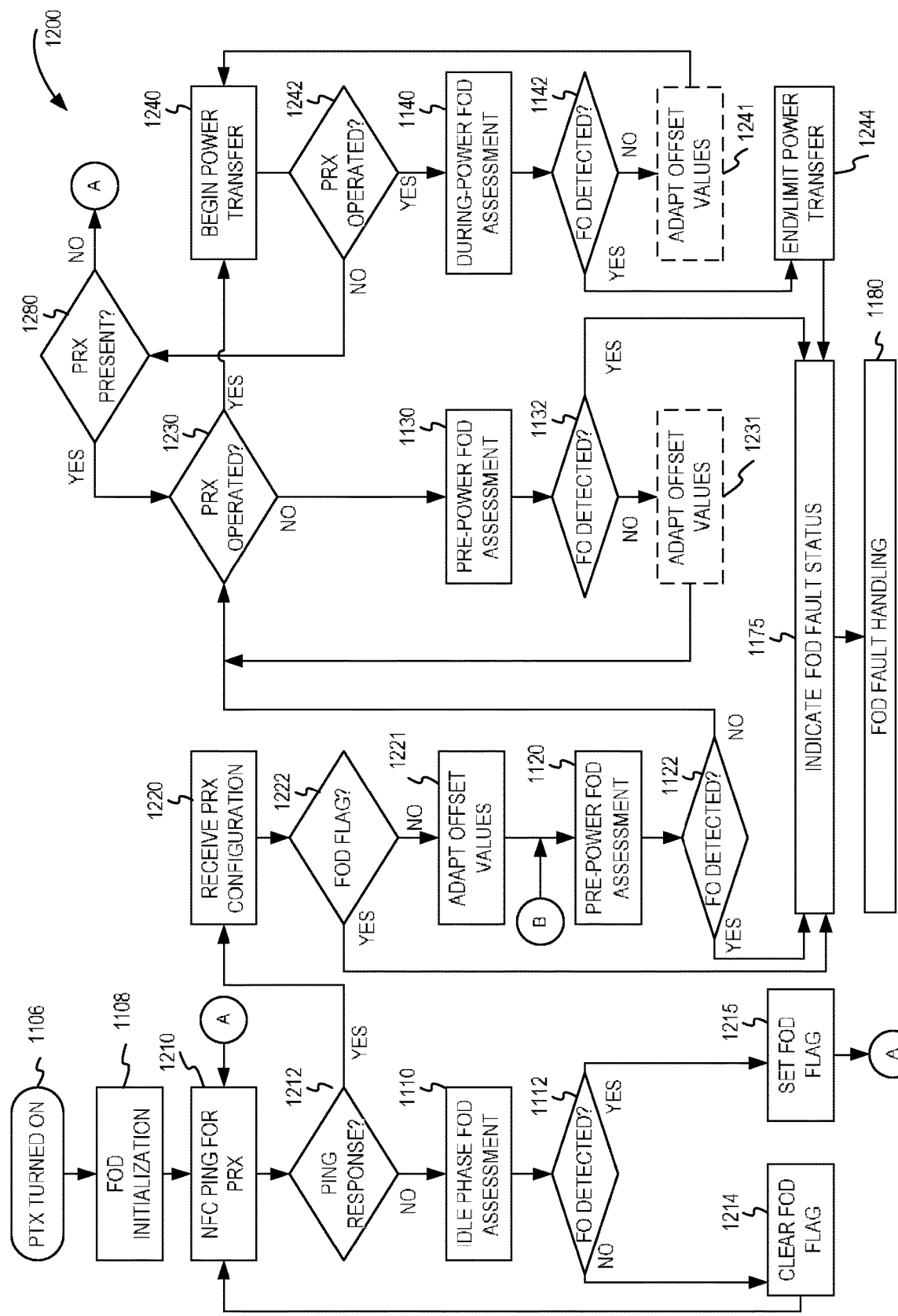
FIG. 12 shows a detailed diagram of foreign object detection assessments in relationship to the various operating phases of a WPT system.

FIG. 12 shows a detailed diagram 1200 of foreign object detection assessments in relationship to the various operating phases of a WPT system. Elements in FIG. 12 having the same reference numeral as those in FIG. 11 describe like features. At block 1106, the Power Transmitter may be turned on. For example, this may include activating a stovetop or hob that has one or more Power Transmitters integrated therein. When the Power Transmitter is turned on, the Power Transmitter may initialize an FOD assessment unit. The Power Transmitter may initialize the FOD assessment unit before beginning, or during, an idle phase. At block 1108, the FOD assessment unit may set an FOD flag (indicating that the initial idle phase foreign object detection assessment has not yet been performed) and an FOD fault status. For example, the FOD flag may be set to a first value (such as "1") to indicate that the initial idle phase foreign object detection assessment has not yet been performed. Once the initial idle phase foreign object detection assessment has been performed, the FOD flag may be cleared or set to a second value (such as "0") to indicate such. Furthermore, at block 1108, the FOD assessment unit may obtain calibration values and use them to set initial offset values for the initial idle phase foreign object detection assessment.

At block 1210 (in the idle phase), the Power Transmitter may perform an NFC ping to determine whether a Power Receiver is present. If a Power Receiver is present and at least partially powered, the Power Transmitter's NFC ping will result in a communication from the Power Receiver to the Power Transmitter. Otherwise, if the Power Receiver is not present or does not have its communication interface enabled, the Power Transmitter will not receive a communication in response to the NFC ping. At block 1212, if the Power Transmitter receives a response to the NFC ping, the Power Transmitter may transition to the configuration phase at block 1220. Note that, in one scenario, a user may have placed the Power Receiver on the Power Transmitter before turning on the Power Transmitter. Thus, in this scenario, it is possible that the Power Transmitter will transition to the configuration phase before an initial idle phase foreign object detection assessment is performed. As described further in detail below, the process described with reference to FIG. 12 can accommodate this scenario by not clearing the FOD flag and by triggering an FOD fault status, thereby preventing an inaccurate foreign object detection assessment and potentially dangerous outcome.

Continuing briefly with the idle phase, at block 1212, if the Power Transmitter does not receive a ping response, the process may continue to block 1110. At block 1110, the FOD assessment unit may perform an idle phase FOD assessment (such as described with reference to FIG. 13). At block 1112, the FOD assessment unit may check the result of the idle phase FOD assessment 1110 to determine if a foreign object has been detected. Note that, in the idle phase, a Power Receiver that did not respond to the NFC ping would also be treated as a foreign object until after the FOD assessment unit has performed an initial idle phase foreign object detection assessment and the Power Transmitter has received a ping response from the Power Receiver. If the FOD assessment unit determines that a foreign object is detected, the process continues to block 1215 in which the FOD flag is set. From block 1215, the process may return to block 1210 to continue looping in the idle phase until a Power Receiver's NFC ping response is detected. Alternatively, in some implementations (such as when the Power Transmitter or appliance thereof has a user interface), the process may proceed to block 1175 in which the FOD assessment unit indicates an FOD fault status.

In block 1112, if a foreign object is not detected, the process continues to block 1214. In block 1214, the FOD assessment unit may clear the FOD flag to indicate that the initial idle phase foreign object detection assessment has been performed and no foreign object has been detected. From blocks 1214 and 1215, the process returns to block 1210 to again ping for the presence of a Power Receiver and remain in the idle phase until such time that the Power Transmitter receives a ping response from a Power Receiver. After any of the idle phase FOD assessments, if the FOD flag had been previously set and the foreign object is removed by the user, the process would ultimately include block 1214 in which the FOD flag is cleared.

At some point the Power Transmitter may receive a response to the NFC ping. From block 1212, the process may continue to block 1220 (also representing a change from the idle phase to the configuration phase). In block 1220, the Power Transmitter may receive configuration information from the Power Receiver. At block 1222, the Power Transmitter (or the FOD assessment unit) may check the FOD flag. If the FOD flag is set to a first value (such as "1") indicating that the initial idle phase foreign object detection assessment has not been performed or a foreign object was not cleared before the placement of the Power Receiver, the process may continue to block 1175. At block 1175, the FOD assessment unit may indicate an FOD fault status. This scenario happens, for example, when a Power Receiver has been placed on the Power Transmitter before the initial idle phase foreign object detection assessment has been performed (such as before the Power Transmitter is turned on) or when a foreign object has been detected in the idle phase and not yet removed to cause the FOD assessment unit to clear the FOD flag. Because the FOD assessment unit cannot confirm that no foreign object is present, the FOD flag and FOD fault status would prevent the Power Transmitter from continuing operation until an idle phase foreign object detection assessment can be performed and the FOD assessment unit can confirm that no foreign object is present. As described further herein, the FOD fault handling 1180 may include the user removing the Power Receiver briefly so that the Power Transmitter can return to the idle phase (block 1210) and perform another idle phase FOD assessment at block 1110 in the idle phase. For example, the FOD fault handling 1180 may include the user removing the foreign object or Power Receiver so that the idle phase FOD assessment 1110 can verify that the interface surface is clear of all foreign objects and Power Receiver.

In block 1222, if the FOD flag is cleared (or otherwise indicates that the idle phase foreign object detection assessment has confirmed there are no foreign objects present before placement of the Power Receiver), the process may continue to block 1221. In block 1221, the FOD assessment unit may perform an adaptation to recalibrate the offset values. The FOD assessment unit may take new measurements of the detection values and store them as adapted offset values. Thus, the adapted offset values take into account the presence of the Power Receiver in the interface surface.

At block 1120, the FOD assessment unit may perform another foreign object detection assessment, this time with the Power Receiver placed over the Power Transmitter. This operation at block 1120 may be used to verify that no foreign object has been introduced and also to adapt the offset values that can be used in subsequent foreign object detection assessments for taking care of impedance changes on account of movement of the Power Receiver on the interface surface. At block 1122 (in the configuration phase), if a foreign object is detected, the process may continue to block 1175 to indicate an FOD fault status and cease the configuration operating phase. Otherwise, at block 1122, if no foreign object is detected, the process may continue to block 1230. In some implementations, the FOD assessment unit may adapt the offset values (not shown) to account for the system changes, such as movement of the Power Receiver. After the adaptation, the updated offset values may be used in a subsequent foreign object detection assessment, including those associated with a later operating phase of the WPT system.

At block 1230, the Power Transmitter may determine whether the Power Receiver is ready for operation. When the Power Receiver is operated, it is ready to receive the wireless power transfer. Typically, a user interface on the Power Receiver may control whether the Power Receiver is ready for operation, such as when a user presses a button to activate the Power Receiver. If the Power Receiver is not ready for operation, the process may continue to block 1130. At block 1130, the FOD assessment unit may perform a foreign object detection assessment and at block 1132, the FOD assessment unit may determine whether the result of the foreign object detection assessment indicates a foreign object is detected or not. If a foreign object is detected, the process continues to block 1175. If no foreign object is detected, the process continues to block 1231. At block 1231, the FOD assessment unit may adapt the offset values to account for the system changes. For example, if the FOD assessment unit detects a movement of the Power Receiver (such as based on a count of adjusted detection values being above a threshold quantity), the FOD assessment unit may perform an adaptation to adapt the offset values for use in a subsequent foreign object detection assessment. Note that blocks 1230, 1130, 1132 and 1231 may form a loop such that the FOD assessment unit can periodically or continuously monitor for a foreign object introduced into the operative environment of the Power Transmitter while the Power Transmitter is in the connected phase and the Power Receiver is not being operated. When the Power Receiver is ready for operation, the Power Receiver may communicate a message to the Power Transmitter to request a transition from the connected phase to the power transfer phase. At block 1230, when the Power Receiver is ready for operation (as indicated by the aforementioned message), the Power Transmitter may transition to the power transfer phase at block 1240.

At block 1240, the Power Transmitter may begin power transfer by energizing a primary coil of the Power Transmitter and generating an electromagnetic field to transfer power to the Power Receiver. During the power transfer phase, the Power Transmitter may periodically confirm that the Power Receiver is being operated (shown at block 1242) and the FOD assessment unit may periodically perform foreign object detection assessments (shown at block 1140). At any time that the Power Receiver is no longer being operated (as determined in block 1242), the process may continue to block 1280. At block 1280, the Power Transmitter may determine whether the Power Receiver is still present. If so, the Power Transmitter may transition back to the connected phase at block 1230. If the Power Receiver has been removed, the Power Transmitter may transition back to the idle phase at block 1210. During the power transfer phase, the FOD assessment unit may periodically perform foreign object detection assessments (shown at block 1140). This enables the WPT system to react to an introduction of a foreign object in the operative environment. At block 1142, when the FOD assessment unit determines that no foreign object is present, the process proceed to block 1241 to adapt the offset values to account for system changes, if any. From block 1241, the process may return to block 1240 to continue the wireless power transfer. At block 1142, when a foreign objected is detected, the process may continue to block 1244. At block 1244, the Power Transmitter may end or limit the wireless power transfer. From block 1244, the process may continue to block 1175 to indicate an FOD fault status.

At block 1175, the WPT system (such as the FOD assessment unit, the Power Transmitter, or the Power Receiver, among other examples) may indicate the FOD fault status. For example, the FOD fault status may be presented via a user interface associated with the Power Transmitter, the Power Receiver, or both. In some implementations, the FOD fault status may include a communication from the Power Transmitter to the Power Receiver (or vice versa) to communicate that an FOD fault status has been indicated. At block 1180, there may be a multitude of ways to clear an FOD fault status, such as those described with reference to FIG. 14. For example, the user may remove the foreign object. In another example, the user may remove the Power Receiver to enable the FOD assessment unit to perform an idle phase foreign object detection assessment in the idle phase using the initial offset values before returning the Power Receiver. In some implementations, a user interface may enable a manual override to reset the FOD fault status or to force an adaptation of the offset values to account for metals present in the operative environment and known to the user to be safe for use in the operative environment. Furthermore, a user interface may enable a manual initiation of a calibration procedure to measure new calibration values to be stored in a non-volatile memory for use the next time the Power Transmitter is turned on.

Figure 13:
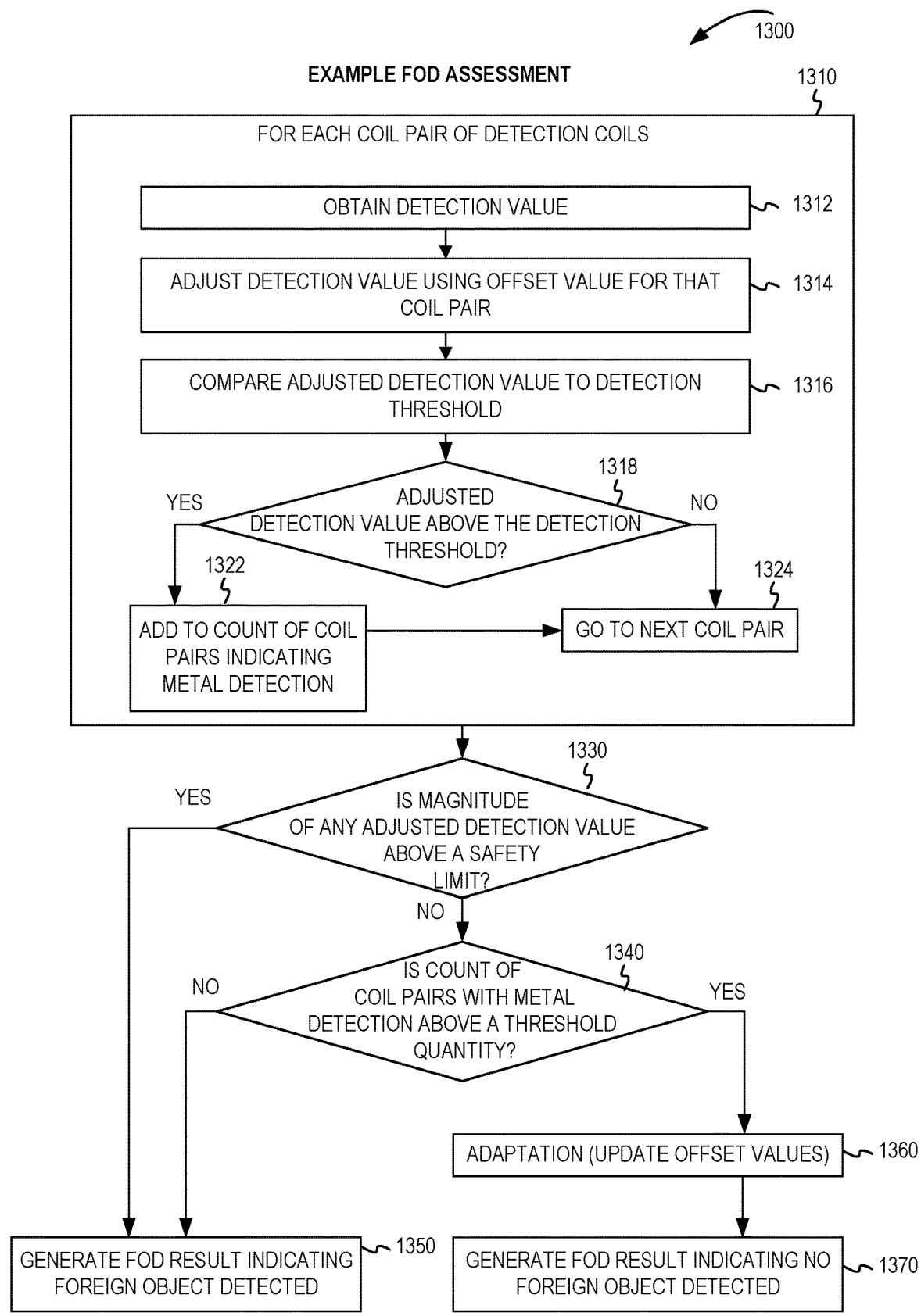
FIG. 13 shows a process for a foreign object detection assessment.

FIG. 13 shows a process 1300 for a foreign object detection assessment. At block 1310, a FOD assessment unit may assess detection values for each coil pair of the detection coils. For example, at block 1312, the FOD assessment unit may obtain a detection value (such as a differential current or differential voltage). At block 1314, the FOD assessment unit may adjust the detection value using an offset value for that coil pair. In the idle phase, the offset value may be an initial offset value based on a calibration value. In the other operating phases, the offset value may be an adapted offset value based on a previous foreign object detection assessment. At block 1316, the FOD assessment unit may compare the adjusted detection value (or an absolute value of the adjusted detection value) to a detection threshold. At block 1318, if the adjusted detection value is above the detection threshold, the process may continue to block 1322. At block 1322, the FOD assessment unit may determine that a metal object (perhaps a foreign object or the Power Receiver) has been detected. At block 1322, the FOD assessment unit may add the coil pair to a count of coil pairs that have detected a metal object. The count of coil pairs is reset for each foreign object detection assessment and represents a count of coil pairs impacted by the presence of a metal object during a particular iteration of the foreign object detection assessment. The process may continue to block 1324, where the FOD assessment unit continues to assess a next coil pair in the same manner as described with reference to block 1310. At block 1318, when the adjusted detection value is not above the detection threshold, the FOD assessment unit may determine that the coil pair is not affected by a metal object and the process continues to block 1324 to assess a next coil pair. After assessing multiple coil pairs at bock 1310, the process may continue to block 1330.

At block 1330, in some implementations the FOD assessment unit may determine whether a magnitude of any adjusted detection value is above a safety limit. If so, the process may continue to block 1350 where the FOD assessment unit may generate an FOD result indicating that a foreign object has been detected. Alternatively, or additionally, the FOD assessment unit may cause a user interface to request user feedback whether to continue with the FOD assessment. The safety limit provides a mechanism to detect a faulty coil pair, sensor, or a foreign object that may be present near one coil pair, even if multiple coil pairs have also registered the presence of a Power Receiver. For example, the safety limit may be higher than the detection threshold in block 1318. If none of magnitudes of the adjusted detection values are above the safety limit, the process may continue to block 1340.

At block 1340, the FOD assessment unit may determine whether the count of coil pairs with metal detection (as accumulated at block 1322) is above a threshold quantity. In some implementations, the threshold quantity may depend on the operating phase the Power Transmitter. For example, in the idle phase, when the Power Receive is absent, a single coil pair or even if all coil pairs have metal detection, the FOD assessment unit will trigger an FOD fault status and the process will proceed to block 1350. In the configuration phase, connected phase, or power transfer phase, the threshold quantity may be set such that three or more coil pairs having metal detection may be interpreted as being due to movement of the Power Receiver.

Returning to block 1340, if the count is below the threshold quantity, the process continues to block 1350. As a reminder, at block 1350, the FOD assessment unit may generate an FOD result indicating a foreign object has been detected. By way of example, at block 1340, in the configuration phase, connected phase, or power transfer phase, if only one or two coil pairs has detected a metal object (and the threshold quantity is three coil pairs), the FOD assessment unit may infer that that coil pair has detected a foreign metal object. Alternatively, in the configuration phase, connected phase, or power transfer phase, if multiple coil pairs (above the threshold quantity, such as three) have detected a change in the adjusted detection values, the FOD assessment unit may infer that such change is due to a movement of the Power Receiver. At block 1340, if the count of coil pairs with metal detection is above the threshold quantity, the process may continue to block 1360. At block 1360, the FOD assessment unit may perform an adaption in which the FOD assessment unit updates the offset values to account for the movement of the Power Receiver. Thereafter, the updated offset values may be used for a subsequent foreign object detection assessment. At block 1370, the FOD assessment unit may generate an FOD result indicating that no foreign object has been detected.

Figure 14:
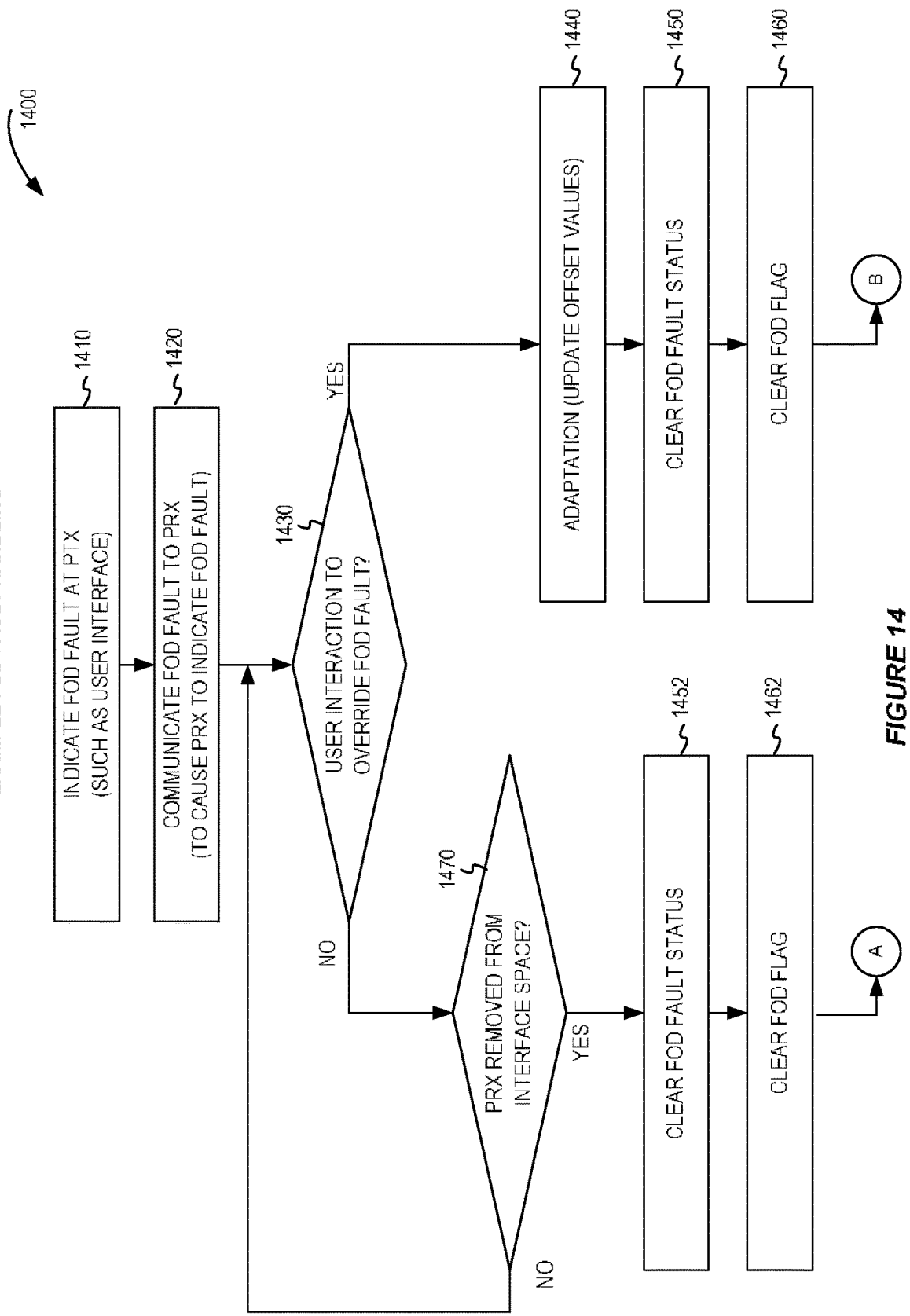
FIG. 14 shows example operations for foreign object detection (FOD) fault handling.

FIG. 14 shows example operations 1400 for FOD fault handling. The example operations 1400 are provided as options, some of which may be omitted in various implementations. At block 1410, a Power Transmitter may indicate the FOD fault, such as via a user interface associated with the Power Transmitter. At block 1420, the Power Transmitter (or the FOD assessment unit) may communicate the FOD fault status to the Power Receiver. In turn, the Power Receiver may indicate the FOD fault, such as via a user interface associated with the Power Receiver.

In some implementations, a user interaction (such as via a user interface associated with the Power Transmitter or the Power Receiver) may cause the WPT system to override the FOD fault. At block 1430, when a user interaction overrides the FOD fault, the process may continue to block 1440. Otherwise, the process may continue to another FOD fault handling option, such as at block 1470. At block 1440, based on a user override, the FOD assessment unit may perform an adaptation in which the FOD assessment unit updates the offset values based on the existing detection values. At block 1450, the FOD assessment unit may clear the FOD fault status. At block 1460, the FOD assessment unit may reset the FOD flag. From there, the Power Transmitter may return (via reference "B") to block 1120 of FIG. 12. In some implementations, with the user override, the Power Transmitter may return to block 1221 or block 1230 of FIG. 12 and proceed subsequently to the connected phase.

In some implementations, the FOD fault status may be cleared by removing the Power Receiver from the interface surface. At block 1470, when the Power Receiver is removed from the interface surface, the WPT system may revert to the idle phase. At block 1452, the FOD assessment unit may clear the FOD fault status. At block 1462, the FOD assessment unit may clear or reset the FOD flag. From there, the Power Transmitter may return (via reference "A") to block 1210 of FIG. 12 and the idle phase.

Figure 15:
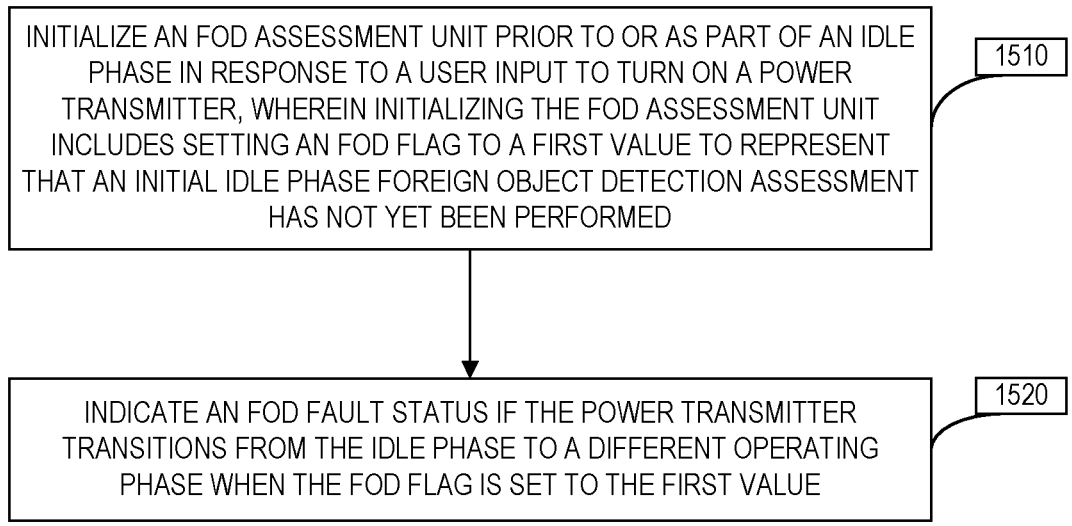
FIG. 15 shows a flowchart diagram of an example process for detecting a foreign object in accordance with some implementations.

FIG. 15 shows a flowchart diagram of an example process 1500 for detecting a foreign object in accordance with some implementations. The operations of the process 1500 may be implemented by an FOD assessment unit as described herein. For example, the operations of process 1500 may be implemented by a FOD assessment unit described with reference to FIGS. 2-14. In some implementations, the FOD assessment unit may be included in, or part of, a transmission controller of a Power Transmitter. Alternatively, the operations of process 1500 may be performed by a Power Transmitter, a Power Receiver, or another component of the WPT system. For brevity, the operations of process 1500 are described as performed by an apparatus.

At block 1510, the apparatus may initialize an FOD assessment unit prior to or as part of an idle phase in response to a user input to turn on a Power Transmitter. Initializing the FOD assessment unit may include setting an FOD flag to a first value to represent that an initial idle phase foreign object detection assessment has not yet been performed.

At block 1520, the apparatus may indicate an FOD fault status if the Power Transmitter transitions from the idle phase to a different operating phase when the FOD flag is set to the first value.

Figure 16:
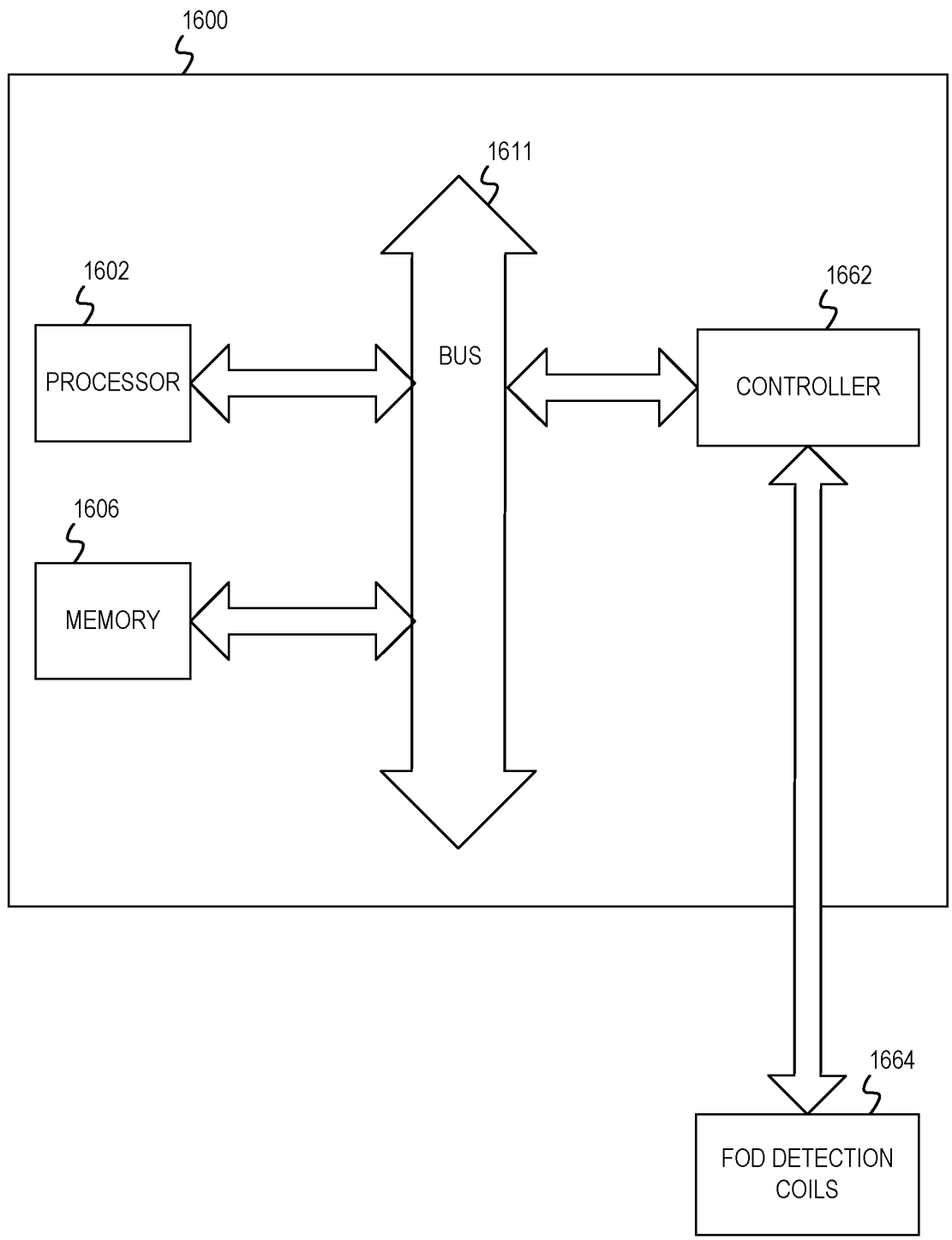
FIG. 16 shows a block diagram of an example apparatus for use in wireless power transfer system.

FIG. 16 shows a block diagram of an example apparatus 1600 for use in wireless power transfer system. In some implementations, the apparatus 1600 may be a detection apparatus, such as any of the detection apparatuses described herein. In some implementations, the apparatus 1600 may be an FOD assessment unit, such as any of the FOD assessment units described herein. The apparatus 1600 can include a processor 1602 (possibly including multiple processors, multiple cores, multiple nodes, or implementing multithreading, etc.). The apparatus 1600 also can include a memory 1606. The memory 1606 may be system memory or any one or more of the possible realizations of computer-readable media described herein. The apparatus 1600 also can include a bus 1611 (such as PCI, ISA, PCI-Express, HyperTransport®, InfiniBand®, NuBus®, AHB, AXI, etc.).

The apparatus 1600 may include one or more controller(s) 1662 configured to manage excitation of multiple detection coils (such as a coil array 1664). In some implementations, the controller(s) 1662 can be distributed within the processor 1602, the memory 1606, and the bus 1611. The controller(s) 1662 may perform some or all of the operations described herein. For example, the controller(s) 1662 may implement the features of a driver controller described herein.

The memory 1606 can include computer instructions executable by the processor 1602 to implement the functionality of the implementations described with reference to FIGS. 1-15. Any one of these functionalities may be partially (or entirely) implemented in hardware or on the processor 1602. For example, the functionality may be implemented with an application specific integrated circuit, in logic implemented in the processor 1602, in a co-processor on a peripheral device or card, etc. Further, realizations may include fewer or additional components not illustrated in FIG. 16. The processor 1602, the memory 1606, and the controller(s) 1662 may be coupled to the bus 1611. Although illustrated as being coupled to the bus 1611, the memory 1606 may be coupled to the processor 1602.

The figures, operations, and components described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (enumerated as clauses for clarity).

Clauses

Clause 1. A method for foreign object detection (FOD) in a wireless power transfer (WPT) system, including: initializing an FOD assessment unit prior to or as part of an idle phase in response to a user input to turn on a Power Transmitter, where initializing the FOD assessment unit includes setting an FOD flag to a first value to represent that an initial idle phase foreign object detection assessment has not yet been performed; and indicating an FOD fault status if the Power Transmitter transitions from the idle phase to a different operating phase when the FOD flag is set to the first value.

Clause 2. The method of clause 1, further including: performing the initial idle phase foreign object detection assessment when the Power Transmitter is in the idle phase; and setting the FOD flag to a second value when a result of the initial idle phase foreign object detection assessment indicates that no foreign object is detected; and indicating the FOD fault status when the result of the initial idle phase foreign object detection assessment indicates that a foreign object is detected.

Clause 3. The method of clause 1, further including: determining that the Power Transmitter has transitioned from the idle phase to the different operating phase based on presence of a Power Receiver before the initial idle phase foreign object detection assessment has been performed, said determining based, at least in part, on the FOD flag being set to the first value when the Power Transmitter transitions from the idle phase to the different operating phase.

Clause 4. The method of clause 3, further including: indicating the FOD fault status to prompt a removal of the Power Receiver from an interface surface associated with the Power Transmitter.

Clause 5. The method of any one of clauses 1-4, where the initial idle phase foreign object detection assessment is unique compared to a pre-power foreign object detection assessment and a during-power foreign object detection assessment associated with different respective operating phases.

Clause 6. The method of any one of clauses 1-5, where performing the initial idle phase foreign object detection assessment includes: obtaining a plurality of detection values, each detection value indicating a disparity between detection coils in a respective pair of detection coils; adjusting one or more of the plurality of detection values by adding or subtracting corresponding ones of a plurality of offset values, where the plurality of offset values are initial offset values based on a calibration of the FOD assessment unit; comparing each of the plurality of detection values to a detection threshold; and determining that a foreign object is detected when at least one of the plurality of detection values is above the detection threshold.

Clause 7. The method of clause 6, where initializing the FOD assessment unit further includes: obtaining the calibration values from a non-volatile memory; and determining the initial offset values based on the calibration values.

Clause 8. The method of clause 7, further including: determining the calibration values as part of a manufacturing, installation or servicing of the Power Transmitter; and storing the calibration values in the non-volatile memory.

Clause 9. The method of any one of clauses 1-8, further including: setting the FOD flag to a second value when a result of the initial idle phase foreign object detection assessment indicates that no foreign object is detected; determining that the Power Transmitter has transitioned from the idle phase to a configuration phase in response to a communication handshake between the Power Transmitter and a Power Receiver; and adapting a plurality of offset values for use in a pre-power foreign object detection assessment.

Clause 10. The method of clause 9, where adapting the FOD assessment unit includes: obtaining a plurality of detection values, each detection value indicating a disparity between detection coils in a respective pair of detection coils, and updating the plurality of offset values based on the plurality of detection values; and storing the plurality of offset values in a volatile memory of the Power Transmitter for use in a subsequent foreign object detection assessment.

Clause 11. The method of any one of clauses 1-10, further including: performing a plurality of foreign object detection assessments at more than one operating phase of the Power Transmitter, the plurality of FOD assessments including at least a pre-power foreign object detection assessment performed in a configuration phase or a connected phase.

Clause 12. The method of clause 11, where the pre-power foreign object detection assessment includes: obtaining updated values for the plurality of detection values; adjusting one or more of the plurality of detection values by adding or subtracting corresponding ones of the plurality of offset values; comparing each of the plurality of detection values to a detection threshold; determining a count of how many of the plurality of detection values are above the detection threshold; and indicating that a result of the pre-power foreign object detection assessment is that a foreign object is detected when the count is less than a threshold quantity.

Clause 13. The method of clause 12, where the pre-power foreign object detection assessment further includes: indicating that the result of the pre-power foreign object detection assessment is that a foreign object is detected when a magnitude of any one of the plurality of detection values is above a limit.

Clause 14. The method of clause 12, where the pre-power foreign object detection assessment further includes: indicating that the result of the pre-power foreign object detection assessment is that no foreign object is detected when the count is zero or when the count is greater than or equal to the threshold quantity.

Clause 15. The method of any one of clauses 12-14, further including: determining that a Power Receiver has moved when the count is greater than or equal to the threshold quantity; and adapting the plurality of offset values in to generate an updated plurality of offset values based on the plurality of detection values in response to a determination that the Power Receiver has moved such that the updated plurality of offset values are usable in a subsequent foreign object detection assessment.

Clause 16. The method of clause 15, further including: storing the updated plurality of offset values in a volatile memory such that the updated plurality of offset values is maintained while the Power Transmitter is turned on and the updated plurality of offset values are discarded when the Power Transmitter is turned off.

Clause 17. The method of any one of clauses 1-16, where indicating the FOD fault status includes at least one of: causing a user interface to present an indication of the FOD fault status, where the user interface is at the Power Transmitter, an appliance that houses the Power Transmitter, or a Power Receiver placed on an interface surface of the Power Transmitter, or communicating an indication of the FOD fault status via a communication interface associated with the Power Transmitter.

Clause 18. The method of any one of clauses 1-17, further including: receiving an indication of a user interaction to override the FOD fault status; setting the FOD flag to the second value; and clearing the FOD fault status.

Clause 19. The method of clause 18, further including: adapting the plurality of offset values for a subsequent foreign object detection assessment in response to said receiving the indication to override the FOD fault status.

Clause 20. The method of clause 19, further including: transitioning to the idle phase once the Power Receiver is removed from the interface surface; and performing the initial idle phase foreign object detection assessment when the Power Transmitter is in the idle phase.

Clause 21. A system for foreign object detection (FOD), including: a Power Transmitter configured to initialize an FOD assessment unit prior to or as part of an idle phase in response to a user input to turn on a Power Transmitter, where initializing the FOD assessment unit includes setting an FOD flag to a first value to represent that an initial idle phase foreign object detection assessment has not yet been performed; and the FOD assessment unit configured to indicate an FOD fault status if the Power Transmitter transitions from the idle phase to a different operating phase when the FOD flag is set to the first value.

Clause 22. The system of clause 21, where the FOD assessment unit is further configured to: perform the initial idle phase foreign object detection assessment when the Power Transmitter is in the idle phase; and set the FOD flag to a second value when a result of the initial idle phase foreign object detection assessment indicates that no foreign object is detected; and indicate the FOD fault status when the result of the initial idle phase foreign object detection assessment indicates that a foreign object is detected.

Clause 23. The system of clause 21, where the FOD assessment unit is configured to determine that the Power Transmitter has transitioned from the idle phase to the different operating phase based on presence of a Power Receiver before the initial idle phase foreign object detection assessment has been performed, said determining based, at least in part, on the FOD flag being set to the first value when the Power Transmitter transitions from the idle phase to the different operating phase.

Clause 24. The system of clause 23, where the FOD assessment unit is configured to indicate the FOD fault status to prompt a removal of the Power Receiver from an interface surface associated with the Power Transmitter.

Clause 25. The system of any one of clauses 21-24, where the initial idle phase foreign object detection assessment is unique compared to a pre-power foreign object detection assessment and a during-power foreign object detection assessment associated with different respective operating phases.

Clause 26. The system of any one of clauses 21-25, where, during the idle phase, the FOD assessment unit is configured to: obtain a plurality of detection values, each detection value indicating a disparity between detection coils in a respective pair of detection coils; adjust one or more of the plurality of detection values by adding or subtracting corresponding ones of a plurality of offset values, where the plurality of offset values are initial offset values based on a calibration of the FOD assessment unit; compare each of the plurality of detection values to a detection threshold; and determine that a foreign object is detected when at least one of the plurality of detection values is above the detection threshold.

Clause 27. The system of clause 26, further including: the non-volatile memory configured to store the calibration values, and where the FOD assessment unit is configured to determine the initial offset values based on the calibration values.

Clause 28. The system of any one of clauses 21-27, where the FOD assessment unit is configured to: set the FOD flag to a second value when a result of the initial idle phase foreign object detection assessment indicates that no foreign object is detected; determine that the Power Transmitter has transitioned from the idle phase to a configuration phase in response to a communication handshake between the Power Transmitter and a Power Receiver; and adapt a plurality of offset values for use in a pre-power foreign object detection assessment.

Clause 29. The system of clause 28, where the FOD assessment unit is further configured to: obtain a plurality of detection values, each detection value indicating a disparity between detection coils in a respective pair of detection coils, and update the plurality of offset values based on the plurality of detection values; and store the plurality of offset values in a volatile memory of the Power Transmitter for use in a subsequent foreign object detection assessment.

Clause 30. The system of any one of clauses 21-29, where the FOD assessment unit is configured to perform a plurality of foreign object detection assessments at more than one operating phase of the Power Transmitter, the plurality of FOD assessments including at least a pre-power foreign object detection assessment performed in a configuration phase or a connected phase.

Clause 31. The system of clause 30, where the FOD assessment unit being configured to perform the pre-power foreign object detection assessment includes the FOD assessment unit being configured to: obtain updated values for the plurality of detection values; adjust one or more of the plurality of detection values by adding or subtracting corresponding ones of the plurality of offset values; compare each of the plurality of detection values to a detection threshold; determine a count of how many of the plurality of detection values are above the detection threshold; and indicate that a result of the pre-power foreign object detection assessment is that a foreign object is detected when the count is less than a threshold quantity.

Clause 32. The system of clause 31, where the FOD assessment unit being configured to perform the pre-power foreign object detection assessment includes the FOD assessment unit being configured to: indicate that the result of the pre-power foreign object detection assessment is that a foreign object is detected when a magnitude of any one of the plurality of detection values is above a limit.

Clause 33. The system of clause 31, where the FOD assessment unit being configured to perform the pre-power foreign object detection assessment includes the FOD assessment unit being configured to: indicate that the result of the pre-power foreign object detection assessment is that no foreign object is detected when the count is zero or when the count is greater than or equal to the threshold quantity.

Clause 34. The system of any one of clauses 31-33, where the FOD assessment unit is further configured to: determine that a Power Receiver has moved when the count is greater than or equal to the threshold quantity; and adapt the plurality of offset values in to generate an updated plurality of offset values based on the plurality of detection values in response to a determination that the Power Receiver has moved such that the updated plurality of offset values are usable in a subsequent foreign object detection assessment.

Clause 35. The system of clause 34, where the FOD assessment unit is further configured to: store the updated plurality of offset values in a volatile memory such that the updated plurality of offset values is maintained while the Power Transmitter is turned on and the updated plurality of offset values are discarded when the Power Transmitter is turned off.

Clause 36. The system of any one of clauses 21-35, where the FOD assessment unit being configured to indicate the FOD fault status includes the FOD assessment unit being configured perform to at least one operation of: causing a user interface to present an indication of the FOD fault status, where the user interface is at the Power Transmitter, an appliance that houses the Power Transmitter, or a Power Receiver placed on an interface surface of the Power Transmitter, or communicating an indication of the FOD fault status via a communication interface associated with the Power Transmitter.

Clause 37. The system of any one of clauses 21-36, where the FOD assessment unit is further configured to: receive an indication of a user interaction to override the FOD fault status; set the FOD flag to the second value; and clear the FOD fault status.

Clause 38. The system of clause 37, where the FOD assessment unit is further configured to adapt the plurality of offset values for a subsequent foreign object detection assessment in response to said receiving the indication to override the FOD fault status.

Clause 39. The system of clause 38, where the Power Transmitter is configured to transition to the idle phase once the Power Receiver is removed from the interface surface; and where the FOD assessment unit is configured to perform the initial idle phase foreign object detection assessment when the Power Transmitter is in the idle phase.

Another innovative aspect of the subject matter described in this disclosure can be implemented as an apparatus. The apparatus may include a modem and at least one processor communicatively coupled with the at least one modem. The processor, in conjunction with the modem, may be configured to perform any one of the above-mentioned methods or features described herein.

Another innovative aspect of the subject matter described in this disclosure can be implemented as a computer-readable medium having stored therein instructions which, when executed by a processor, causes the processor to perform any one of the above-mentioned methods or features described herein.

Another innovative aspect of the subject matter described in this disclosure can be implemented as a system having means for implementing any one of the above-mentioned methods or features described herein.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor-executable or computer-executable instructions encoded on one or more tangible processor-readable or computer-readable storage media for execution by, or to control the operation of, a data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for foreign object detection (FOD) in a wireless power transfer (WPT) system, comprising:
    initializing an FOD assessment unit prior to or as part of an idle phase in response to a user input to turn on a Power Transmitter, wherein initializing the FOD assessment unit includes setting an FOD flag to a first value to represent that an initial idle phase foreign object detection assessment has not yet been performed; and
    indicating an FOD fault status if the Power Transmitter transitions from the idle phase to a different operating phase when the FOD flag is set to the first value.

2. The method of claim 1, further comprising:
    performing the initial idle phase foreign object detection assessment when the Power Transmitter is in the idle phase; and
    setting the FOD flag to a second value when a result of the initial idle phase foreign object detection assessment indicates that no foreign object is detected; and
    indicating the FOD fault status when the result of the initial idle phase foreign object detection assessment indicates that a foreign object is detected.

3. The method of claim 1, further comprising:
    determining that the Power Transmitter has transitioned from the idle phase to the different operating phase based on presence of a Power Receiver before the initial idle phase foreign object detection assessment has been performed, said determining based, at least in part, on the FOD flag being set to the first value when the Power Transmitter transitions from the idle phase to the different operating phase.

4. The method of claim 3, further comprising:
    indicating the FOD fault status to prompt a removal of the Power Receiver from an interface surface associated with the Power Transmitter.

5. The method of claim 1, wherein the initial idle phase foreign object detection assessment is unique compared to a pre-power foreign object detection assessment and a during-power foreign object detection assessment associated with different respective operating phases.

6. The method of claim 1, wherein performing the initial idle phase foreign object detection assessment includes:
    obtaining a plurality of detection values, each detection value indicating a disparity between detection coils in a respective pair of detection coils;
    adjusting one or more of the plurality of detection values by adding or subtracting corresponding ones of a plurality of offset values, wherein the plurality of offset values are initial offset values based on a calibration of the FOD assessment unit;
    comparing each of the plurality of detection values to a detection threshold; and
    determining that a foreign object is detected when at least one of the plurality of detection values is above the detection threshold.

7. The method of claim 6, wherein initializing the FOD assessment unit further includes:
    obtaining the calibration values from a non-volatile memory; and
    determining the initial offset values based on the calibration values.

8. The method of claim 7, further comprising:
    determining the calibration values as part of a manufacturing, installation or servicing of the Power Transmitter; and
    storing the calibration values in the non-volatile memory.

9. The method of claim 4, further comprising:
    setting the FOD flag to a second value when a result of the initial idle phase foreign object detection assessment indicates that no foreign object is detected;
    determining that the Power Transmitter has transitioned from the idle phase to a configuration phase in response to a communication handshake between the Power Transmitter and a Power Receiver; and
    adapting a plurality of offset values for use in a pre-power foreign object detection assessment.

10. The method of claim 9, wherein adapting the FOD assessment unit includes:
    obtaining a plurality of detection values, each detection value indicating a disparity between detection coils in a respective pair of detection coils, and
    updating the plurality of offset values based on the plurality of detection values; and
    storing the plurality of offset values in a memory of the Power Transmitter for use in a subsequent foreign object detection assessment.

11. The method of claim 1, further comprising:
    performing a plurality of foreign object detection assessments at more than one operating phase of the Power Transmitter, the plurality of FOD assessments including at least a pre-power foreign object detection assessment performed in a configuration phase or a connected phase.

12. The method of claim 11, wherein the pre-power foreign object detection assessment includes:
    obtaining updated values for the plurality of detection values;
    adjusting one or more of the plurality of detection values by adding or subtracting corresponding ones of the plurality of offset values;
    comparing each of the plurality of detection values to a detection threshold; and
    determining a count of how many of the plurality of detection values are above the detection threshold.

13. The method of claim 12, wherein the pre-power foreign object detection assessment further includes at least one of:
    indicating that a result of the pre-power foreign object detection assessment is that a foreign object is detected when the count is less than a threshold quantity;
    indicating that the result of the pre-power foreign object detection assessment is that a foreign object is detected when a magnitude of any one of the plurality of detection values is above a limit; or indicating that the result of the pre-power foreign object detection assessment is that no foreign object is detected when the count is zero or when the count is greater than or equal to the threshold quantity.

14. The method of claim 12, further comprising:

determining that a Power Receiver has moved when the count is greater than or equal to the threshold quantity; and adapting the plurality of offset values in to generate an updated plurality of offset values based on the plurality of detection values in response to a determination that the Power Receiver has moved such that the updated plurality of offset values are usable in a subsequent foreign object detection assessment.

15. The method of claim 1, wherein indicating the FOD fault status includes at least one of:

causing a user interface to present an indication of the FOD fault status, wherein the user interface is at the Power Transmitter, an appliance that houses the Power Transmitter, or a Power Receiver placed on an interface surface of the Power Transmitter, or communicating an indication of the FOD fault status via a communication interface associated with the Power Transmitter.

16. The method of claim 9, further comprising:

receiving an indication of a user interaction to override the FOD fault status;

setting the FOD flag to the second value; and clearing the FOD fault status.

17. The method of claim 16, further comprising:

adapting the plurality of offset values for a subsequent foreign object detection assessment in response to said receiving the indication to override the FOD fault status.

18. The method of claim 17, further comprising:

transitioning to the idle phase once the Power Receiver is removed from the interface surface; and performing the initial idle phase foreign object detection assessment when the Power Transmitter is in the idle phase.

19. A system for foreign object detection (FOD), comprising:

a Power Transmitter configured to initialize an FOD assessment unit prior to or as part of an idle phase in response to a user input to turn on a Power Transmitter, wherein initializing the FOD assessment unit includes setting an FOD flag to a first value to represent that an initial idle phase foreign object detection assessment has not yet been performed; and the FOD assessment unit configured to indicate an FOD fault status if the Power Transmitter transitions from the idle phase to a different operating phase when the FOD flag is set to the first value.

20. The system of claim 19, wherein the FOD assessment unit is further configured to:

perform the initial idle phase foreign object detection assessment when the Power Transmitter is in the idle phase; and set the FOD flag to a second value when a result of the initial idle phase foreign object detection assessment indicates that no foreign object is detected; and indicate the FOD fault status when the result of the initial idle phase foreign object detection assessment indicates that a foreign object is detected.

21. The system of claim 19, wherein during the idle phase, the FOD assessment unit is configured to:

obtain a plurality of detection values, each detection value indicating a disparity between detection coils in a respective pair of detection coils;

adjust one or more of the plurality of detection values by adding or subtracting corresponding ones of a plurality of offset values, wherein the plurality of offset values are initial offset values based on a calibration of the FOD assessment unit;

compare each of the plurality of detection values to a detection threshold; and determine that a foreign object is detected when at least one of the plurality of detection values is above the detection threshold.

22. The system of claim 19, wherein the FOD assessment unit is configured to:

set the FOD flag to a second value when a result of the initial idle phase foreign object detection assessment indicates that no foreign object is detected;

determine that the Power Transmitter has transitioned from the idle phase to a configuration phase in response to a communication handshake between the Power Transmitter and a Power Receiver; and adapt a plurality of offset values for use in a pre-power foreign object detection assessment.

* * * * *